(12) United States Patent
Hong et al.

(10) Patent No.: US 7,041,260 B1
(45) Date of Patent: May 9, 2006

(54) INTEGRAL COMPACT HEAT EXCHANGER AND CATALYTIC REACTOR FOR SCAVENGING CONTAMINANTS FROM AIR

(75) Inventors: Seung-Ho Hong, Richland, WA (US); Michael R. Powell, Kennewick, WA (US); Charles J. Call, Pasco, WA (US)

(73) Assignee: MesoSystems Technology, Inc., Albuquerque, NM (US)

( * ) Notice: Subject to any disclaimer, the term of this patent is extended or adjusted under 35 U.S.C. 154(b) by 901 days.

(21) Appl. No.: 09/686,917

(22) Filed: Oct. 9, 2000

Related U.S. Application Data

(63) Continuation-in-part of application No. 09/422,206, filed on Oct. 19, 1999, now Pat. No. 6,488,900.

(51) Int. Cl.
*F28F 3/00* (2006.01)
*F28F 3/08* (2006.01)

(52) U.S. Cl. .................. 422/198; 422/199; 165/172; 165/173; 165/186

(58) Field of Classification Search ............... 422/198, 422/199; 165/172, 173, 186
See application file for complete search history.

(56) References Cited

U.S. PATENT DOCUMENTS

| | | | |
|---|---|---|---|
| 1,662,870 A | 3/1928 | Stancliffe | |
| 2,937,780 A * | 5/1960 | Beckwith | 220/560.14 |
| 3,469,934 A | 9/1969 | Bocard et al. | 423/220 |
| 4,350,571 A | 9/1982 | Erickson | 203/21 |
| 4,790,860 A | 12/1988 | Sexton | 55/59 |
| 5,294,410 A | 3/1994 | White | 422/174 |
| 5,326,537 A | 7/1994 | Cleary | 422/173 |
| 5,534,328 A | 7/1996 | Ashmead et al. | 428/166 |
| 5,552,051 A * | 9/1996 | Wang et al. | 210/604 |
| 5,658,537 A | 8/1997 | Dugan | 422/191 |
| 5,811,062 A | 9/1998 | Wegeng et al. | 422/129 |
| 5,914,091 A | 6/1999 | Holst et al. | 422/173 |
| 5,997,619 A | 12/1999 | Knuth et al. | 96/224 |
| 6,001,145 A | 12/1999 | Hammes | 55/471 |
| 6,070,658 A | 6/2000 | Cipriani | 165/166 |
| 6,082,439 A | 7/2000 | Kato et al. | 165/79 |
| 6,082,445 A | 7/2000 | Dugan | 165/168 |
| 6,488,900 B1 * | 12/2002 | Call et al. | 422/173 |

* cited by examiner

*Primary Examiner*—Alexa D. Neckel
(74) *Attorney, Agent, or Firm*—Ronald M. Anderson

(57) ABSTRACT

A fluid treatment system incorporating an integrated heat exchanger and thermal treatment unit. A fan draws or pushes a contaminated fluid through the heat exchanger, which is preferably of the counter flow type. The integrated heat exchanger and thermal treatment unit is fabricated by stacking sheets of metal foil so that gaps are defined between adjacent sheets. These gaps define alternating untreated and treated fluid channels. The untreated fluid flows through the heat exchanger and into the thermal treatment unit, with is disposed within aligned orifices formed in the metal foil sheets. Heat transfer occurs between adjacent treated and untreated channels, which greatly improves the efficiency with which a temperature of the untreated fluid entering the heat exchanger is changed as a result of heat transfer with the treated fluid that is exiting the heat exchanger. A header system is in fluid communication with either all of the treated or all of the untreated fluid channels. The integrated heat exchanger and thermal treatment unit also usable as a chemical reactor to generate a desired chemical product from at least one reactant.

31 Claims, 13 Drawing Sheets

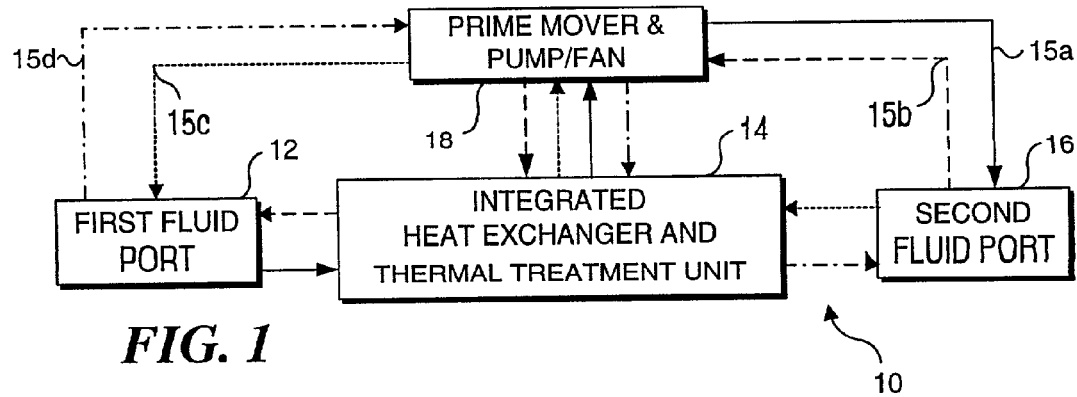

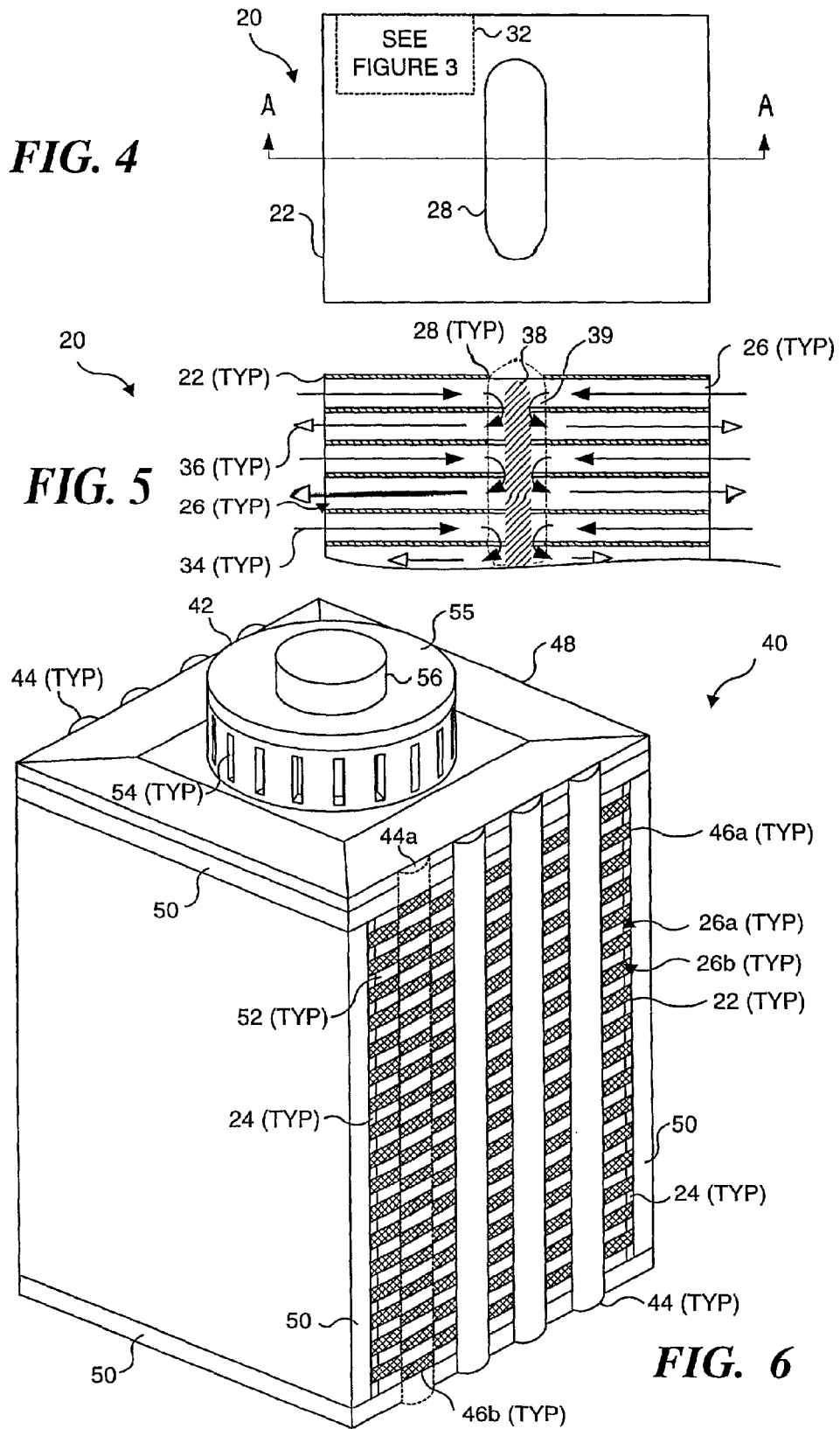

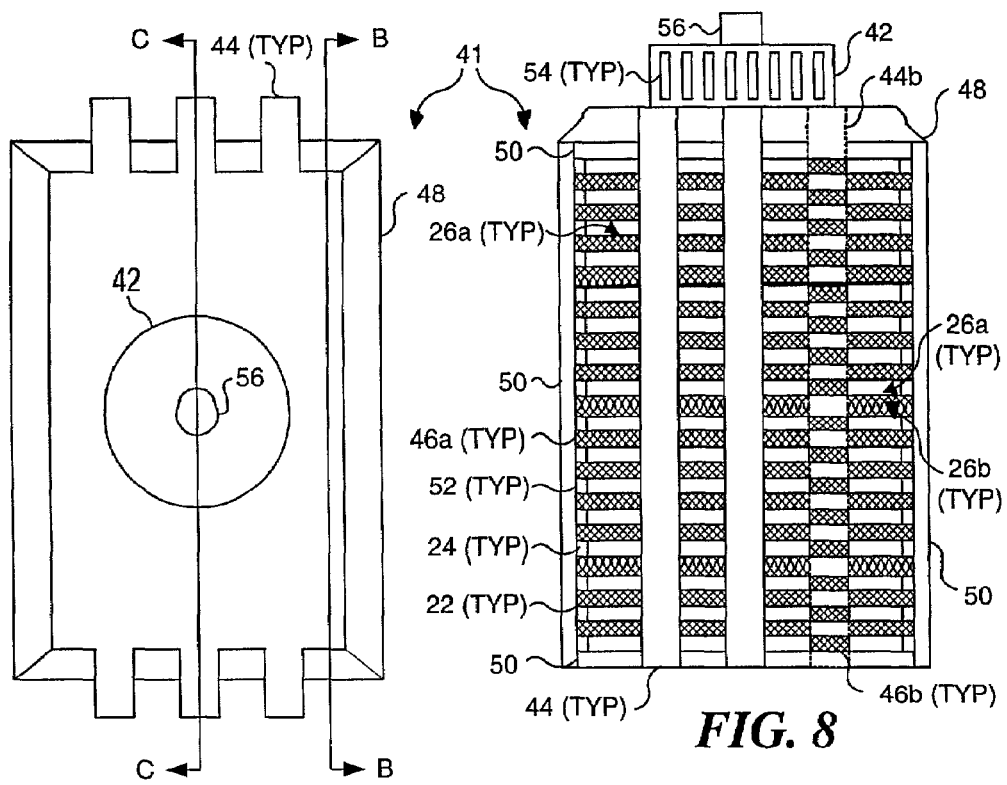
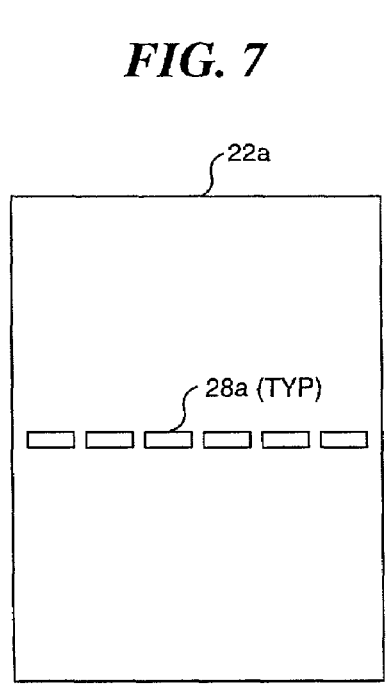
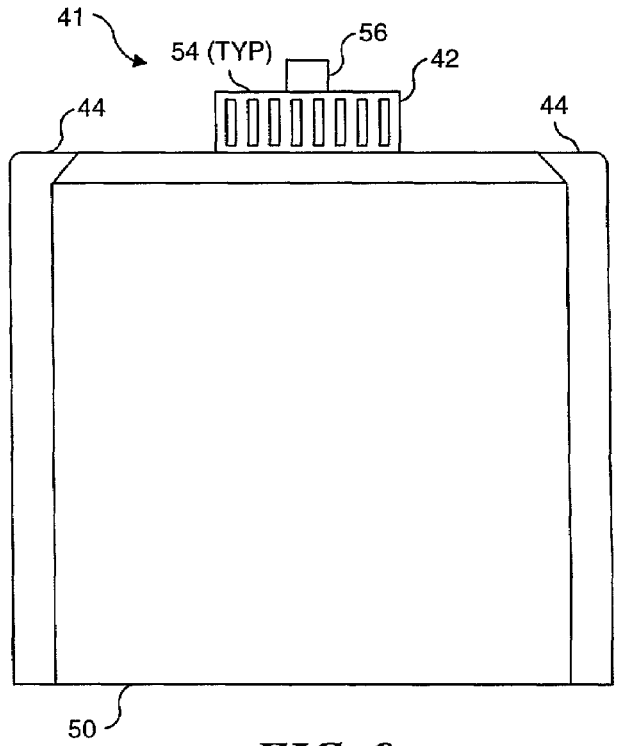
*FIG. 7*
*FIG. 8*
*FIG. 10*
*FIG. 9*

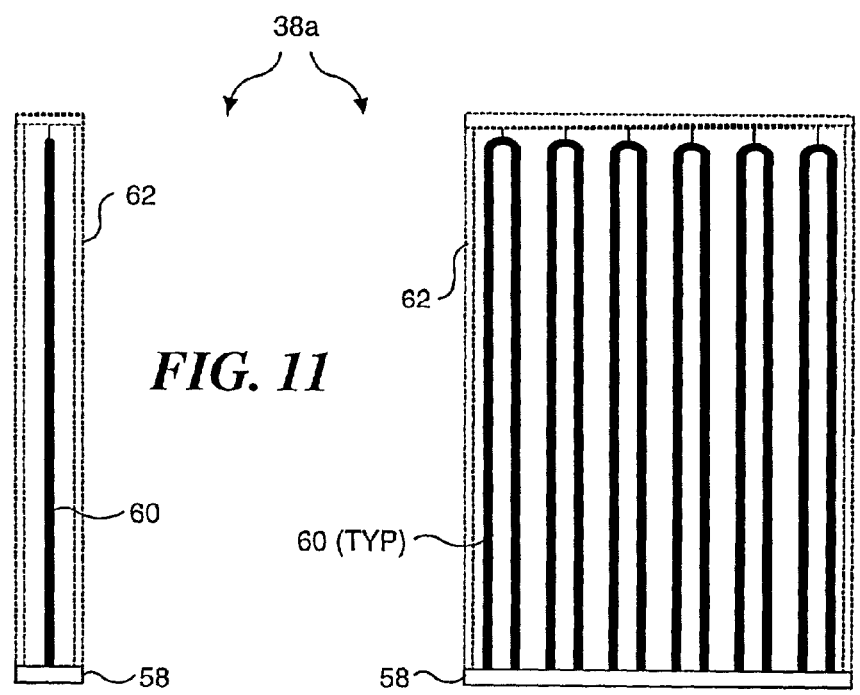
FIG. 11
FIG. 12
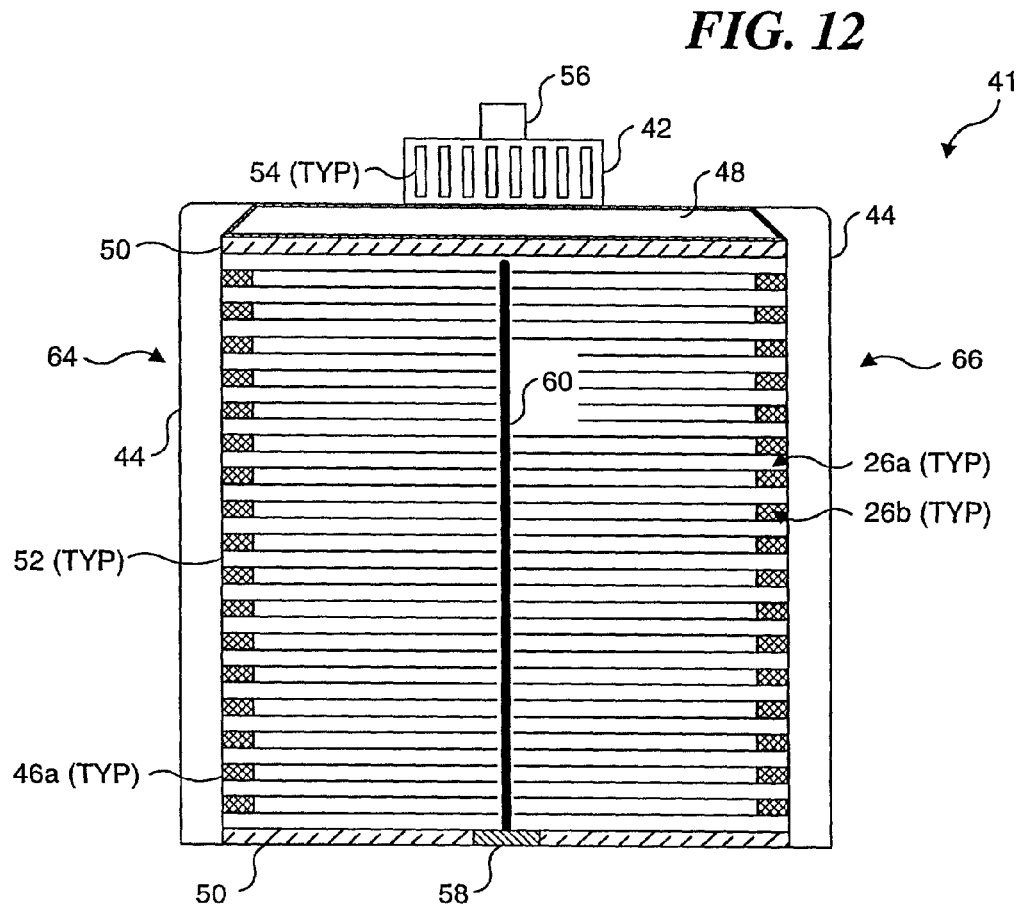
FIG. 13

DIRECTION OF FLUID FLOW

INTEGRAL COMPACT HEAT EXCHANGER AND CATALYTIC REACTOR FOR SCAVENGING CONTAMINANTS FROM AIR

RELATED APPLICATIONS

This application is a continuation in part of a patent application Ser. No. 09/422,206, filed on Oct. 19, 1999, now issued as U.S. Pat. No. 6,488,900, the benefit of the filing date of which is hereby claimed under 35 U.S.C. § 120.

GOVERNMENT RIGHTS

This invention was made under contract with the United States Defense Advanced Research Projects Agency (DARPA), under Contract No. DABT63-98-C-0054. The United States Government may have certain rights in the invention.

FIELD OF THE INVENTION

This invention generally relates to apparatus for air purification, and more specifically, to apparatus for thermally deactivating chemical and biological air contaminants.

BACKGROUND OF THE INVENTION

Ambient air in homes, offices, manufacturing facilities and other workplace environments is often contaminated with biological and chemical contaminants. Many germs and viruses can be spread by airborne vectors. Additionally, molds, fungi, and pollens can be circulated over wide areas by air currents. Trace amounts of chemicals contained in building materials, carpets, machinery, and cleaning products regularly diffuse into the ambient air. These biological and chemical contaminants can cause discomfort to individuals ranging from relatively mild allergic reactions to serious illnesses. Often only trace amounts of these contaminants are required to cause such undesirable reactions. For example, certain chemicals present in new carpets in only a few parts per million (PPM) can cause considerable discomfort. Besides causing discomfort and illness to individuals, such contaminants can also have serious quality-control implications in manufacturing facilities, particularly in high tech and pharmaceutical manufacturing operations. As buildings become better insulated, the quality of the indoor air often becomes worse, because the air exchange rate (the rate at which the internal volume of air is replaced by fresh air from outside the building) is frequently much lower for "tight," well-insulated buildings compared to drafty, less well-insulated buildings.

There are several known methods for removing or destroying chemical species from contaminated air, including adsorption by carbon, photocatalytic oxidation, thermal oxidation, and thermocatalytic oxidation. Similarly, known methods for removing or destroying airborne biological particulates include filtration, photocatalytic oxidation, and thermocatalytic oxidation. Apparatus useful for employing these methods are also well known in the art.

While the forgoing methods (and their associated apparatus) are suitable in certain instances, they may not be desirable in all applications. For example, a specific air filtration device may remove certain types of toxic biological organisms, such as bacteria, while not removing other toxic organisms, such as viruses, or may not be able to reduce the concentration level of a particular toxic species to an acceptable level. Furthermore, the devices used to implement a specific conventional method may require heavy or bulky equipment that is impractical for use in all applications. In particular, air purification units that rely on filtration or carbon adsorption suffer from the disadvantage of requiring frequent maintenance to replace clogged filters or spent carbon. Carbon adsorption filters in particular suffer from the disadvantage that adsorbed contaminants can be desorbed back into the environment from which contaminants are intended to be removed, particularly, when the level of contaminants in the environment is low compared to the level of contaminants that has been adsorbed by the carbon.

Prior art apparatus that destroys airborne contaminants by oxidation does not require ongoing maintenance, unlike filter-based systems. However, prior art thermocatalytic oxidation systems are generally large, bulky and thermally inefficient units. It would thus be desirable to provide thermocatalytic and thermal oxidation air purification units that are compact and have a high thermal efficiency. In particular, it would be desirable to provide a unit in which the thermal treatment unit is integral to the heat exchanger, to reduce the number of seals required, and to increase the efficiency of such a system. A device that integrates a heat exchanger with thermal treatment components is not described in the prior art.

SUMMARY OF THE INVENTION

The present invention defines an integral thermal treatment system for treating a fluid, which includes at least one fluid inlet in fluid communication with at least one untreated fluid channel, and at least one fluid outlet in fluid communication with at least one treated fluid channel. The treated and untreated fluid channels are disposed adjacent to one another, such that an efficient exchange of thermal energy between an untreated fluid flowing within an untreated fluid channel and a treated fluid flowing within a treated fluid channel occurs. A thermal treatment zone is integral to the apparatus, such that an untreated fluid enters the thermal treatment zone via each untreated fluid channel, and a treated fluid exits the thermal treatment zone through each treated fluid channel. This integrated thermal treatment zone eliminates the need for sealing components and a header system that would otherwise be required to place the thermal treatment zone in fluid communication with the treated and untreated fluid channels.

In one embodiment of the present invention, the thermal treatment system includes an insulated housing that substantially encloses the integral untreated and treated fluid channels, and the thermal treatment zone, thereby minimizing the amount of thermal energy escaping from the thermal treatment system. Preferably, the insulated housing is fabricated from aerogel panels.

In another embodiment, a catalytic treatment zone is disposed adjacent to the thermal treatment zone and within either or both of the untreated and treated fluid channels so that untreated fluid heated by the thermal treatment zone is exposed to the catalytic treatment zone. Preferably, the catalytic treatment zone includes a noble-metal-based catalyst that reduces a temperature required to oxidize an organic chemical contaminant. The thermal treatment zone of this embodiment preferably is at a temperature in excess of 300 degrees Celsius (° C.).

In at least one other embodiment, the thermal treatment zone includes at least one electric resistive heating element. In yet another embodiment, the thermal treatment zone includes at least one chiller to enable a condensable compound to be condensed and thus removed from the untreated fluid.

Preferably, the thermal treatment system comprises a plurality of thin sheets stacked together in spaced-apart layers so that a gap is defined between adjacent sheets, forming either an untreated fluid channel or a treated fluid channel. More preferably, the plurality of thin sheets are fabricated from a metal foil. Most preferably, the plurality of thin sheets are fabricated from a stainless steel foil.

Another aspect of the present invention is directed to an apparatus for deactivating chemical and biological contaminants entrained within a volume of fluid. This apparatus functions much as the apparatus described above. Sufficient thermal energy is provided in the thermal treatment zone to decontaminate a fluid by deactivating any chemical and biological contaminants present therein.

In one embodiment, the heat transfer between the contaminated and uncontaminated fluid heats the fluid entering the catalytic treatment zone, and it reduces the amount of heat required to be delivered to the contaminated fluid by the thermal treatment zone in order to deactivate organic chemical contaminants.

Preferably, the plurality of contaminated fluid channels and the plurality of decontaminated fluid channels comprising the heat exchanger are formed from a plurality of thin sheets stacked together in spaced-apart layers. A plurality of spacers are preferably included to define the gap between adjacent thin sheets. In addition, the thin sheets in one embodiment include surface features that extend outward of planar surfaces of the thin sheets to separate adjacent thin sheets, thereby maintaining the gap. As a further alternative, surface features comprising either a plurality of longitudinally extending ribs, and/or a plurality of latitudinally extending ribs, are provided to stiffen the thin sheets.

Also preferably, a cross-flow header system is disposed adjacent to an outside edge of the stack of thin sheets and is in fluid communication either with all of the plurality of contaminated fluid channels, or with all of the plurality of decontaminated fluid channels. A plurality of fluid-diverting structures are preferably disposed within each gap, adjacent to the outside edge of the stack of thin sheets, such that when the cross-flow header system is in fluid communication with each of the plurality of contaminated fluid channels, the plurality of fluid-diverting structures prevent contaminated fluid from entering any of the plurality of contaminated fluid channels except through the cross-flow header system, and prevent decontaminated fluid from entering the cross-flow header system. Alternatively, when the cross-flow header system is in fluid communication with each of the plurality of decontaminated fluid channels, the plurality of fluid-diverting structures prevent contaminated fluid from entering any of the plurality of decontaminated fluid channels and prevent decontaminated fluid from exiting the apparatus except via the cross-flow header system. Preferably the cross-flow header system is formed in the shape of a half tube.

In at least one embodiment, the thermal treatment zone is disposed substantially at a center of each thin sheet. The thin sheets are substantially quadrilateral in shape, or alternatively, substantially round in shape.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a block diagram illustrating the primary components used in the fluid treatment system of the present invention;

FIG. 2 is an isometric view of a portion of a stacked plate countercurrent heat exchanger in accord with the present invention;

FIG. 3 is a cut-away view of plurality of heat exchanger channels illustrating the alternating direction of fluid flow within adjacent channels of the stacked plate countercurrent heat exchanger of FIG. 2;

FIG. 4 is a top plan view the stacked plate countercurrent heat exchanger of FIG. 2;

FIG. 5 is a cross-sectional view of the stacked counterflow heat exchanger shown in FIGS. 2–4, taken along section line A—A in FIG. 4;

FIG. 6 is an isometric view of a preferred embodiment of an air purification apparatus in accord with the present invention;

FIG. 7 is top plan view of a second embodiment of an air purification apparatus;

FIG. 8 is a front elevational view of the second embodiment of the air purification apparatus shown in FIG. 7;

FIG. 9 is a side elevational view of the air purification apparatus of FIG. 7;

FIG. 10 is a top plan view an exemplary thin sheet used to assemble a stacked plate countercurrent heat exchanger for use in the air purification apparatus of FIGS. 7–9;

FIG. 11 is a side elevational view of an electric resistive heater for use in the air purification apparatus of FIGS. 7–10;

FIG. 12 is a front elevational view of the electric resistive heaters of FIG. 11;

FIG. 13 is a cross-sectional view of the exemplary air purification apparatus of FIG. 7, taken along section line B—B in FIG. 7;

Figure 28:
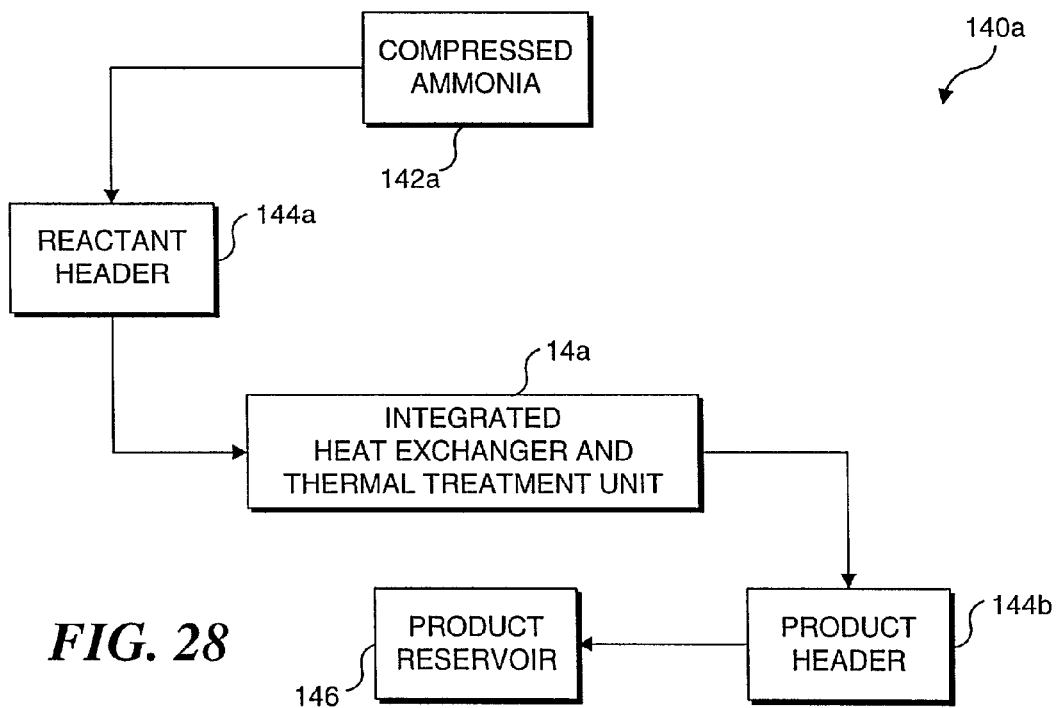
Figure 29:
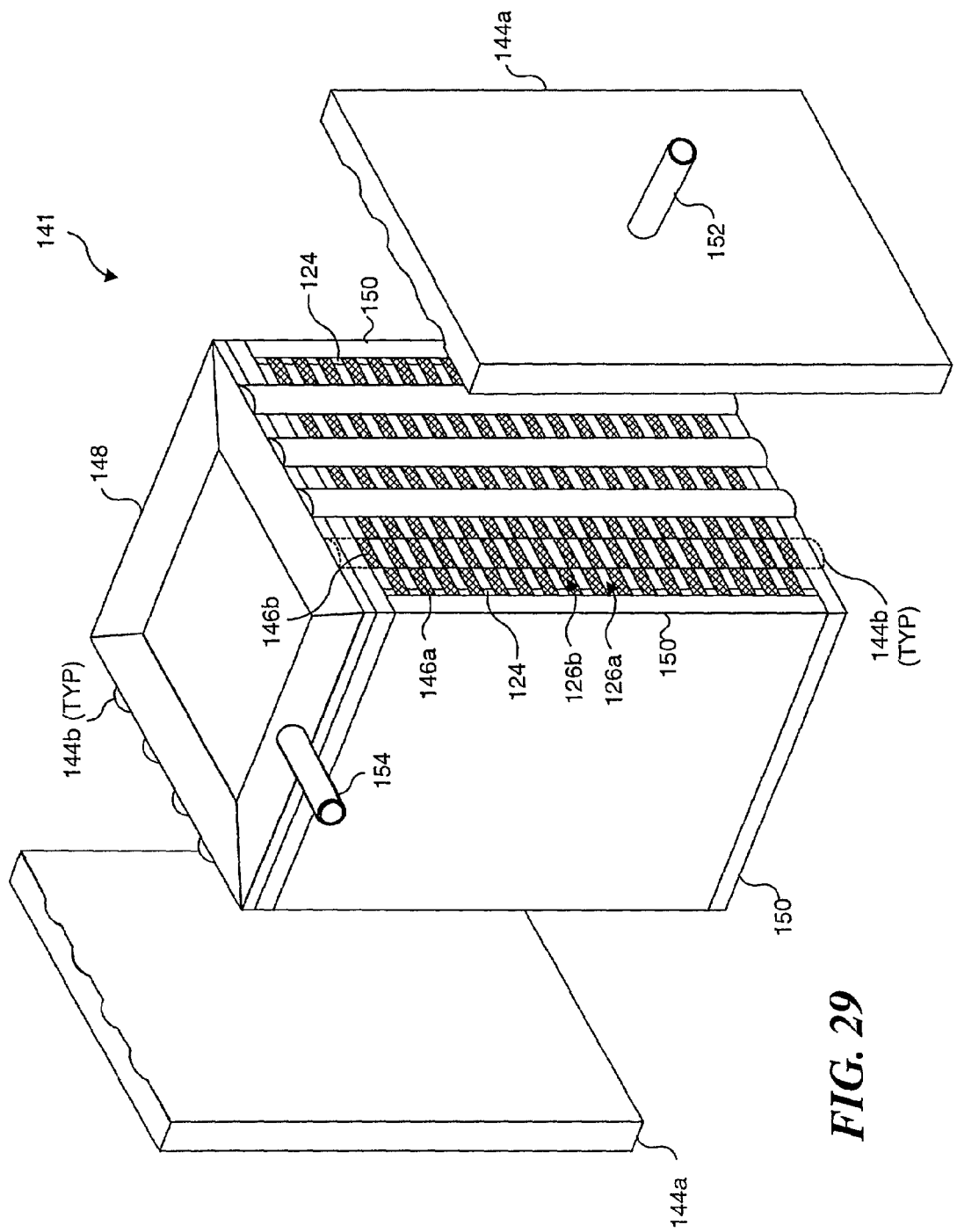

FIG. 28 is a block diagram illustrating components used in the chemical reactor embodiment of the present invention adapted to facilitate the disassociation of ammonia into hydrogen and nitrogen, and FIG. 29 is a partially exploded isometric view of an integrated thermal treatment unit and stacked plate countercurrent heat exchanger adapted to facilitate the production of a desired chemical product from at least one reactant.

DESCRIPTION OF THE PREFERRED EMBODIMENT

Overview of the Present Invention

The present invention is used for thermally treating fluids and is notable for its relatively high thermal energy efficiency, which is achieved by integrating a heat exchanger unit and a thermal treatment unit in a compact thermally insulated enclosure. In the present invention, a thermal treatment unit is disposed inside a highly efficient heat exchanger unit. The fluid channels of this integrated apparatus perform a plurality of functions, including facilitating the transfer of thermal energy between warm fluids and cool fluids, conveying untreated fluids into a thermal treatment zone and treated fluids out of the thermal treatment zone, and providing an inlet for untreated fluids and an outlet for treated fluids.

To achieve the desired high thermal energy efficiency, the heat exchanger portion of the integrated heat exchanger/thermal treatment unit is fabricated as a stacked plate apparatus, with the stacked plates defining the fluid channels in a counter-flow arrangement, so that thermal energy is transferred to the fluid entering the device from the fluid exiting the thermal treatment portion. Thus, the thermal treatment portion of the integrated heat exchanger/thermal treatment unit is not required to provide as much thermal energy to change the temperature of an untreated fluid in order to achieve a desired fluid treatment result. In at least one embodiment, the desired treatment is facilitating the production of a desired chemical product from at least one reactant.

It should be noted that the thermal treatment unit portion of the integrated heat exchanger/thermal treatment unit can be used to either add or remove thermal energy from a fluid to effect a desired treatment. Accordingly, the thermal treatment unit can be a heater or a chiller. If the desired thermal treatment comprises the removal of thermal energy from a fluid, a chiller is used to cool the fluid, thereby removing a condensable compound (e.g., water) from the fluid. In such a unit, the heat exchanger portion of the integrated heat exchanger/thermal treatment unit cools the incoming fluid by transferring heat to the exiting fluid, while the thermal treatment portion of the integrated heat exchanger/thermal treatment unit, which includes the chiller, further cools the incoming fluid as required to effect the desired treatment.

Thermal energy is frequently added to a fluid to effect some sort of treatment. One example of such thermal treatment of a fluid is the purification of air by using heat, as is achieved in one preferred embodiment of the present invention that is described in greater detail below. In this embodiment, the heat exchanger portion of the integrated heat exchanger/thermal treatment unit heats the incoming fluid and cools the exiting fluid, while the thermal treatment portion of the integrated heat exchanger/thermal treatment unit includes a heater that adds further heat to the incoming fluid as required to effect a desired treatment. For air purification, the desired treatment is the destruction or deactivation of contaminants in the air. The heater integrated into the heat exchanger/thermal treatment unit of the present invention can be a light hydrocarbon (e.g., butane, propane, natural gas) burner, an electrical resistance heater, or other type of heater. It is expected that an electrical resistance heater will be particularly useful and is preferred, because it can easily fit into the thermal treatment region formed by the aligning orifices formed in the stacked plates of the apparatus.

When used as an air purification device, the present invention will preferably deactivate at least 90% of any such undesirable species present to a less toxic organic species, or to a non-viable biological species with a reduced energy consumption. In such an embodiment, the apparatus is not designed to remove extremely high levels of contaminants or particulates from air, but rather to remove lower, but potentially toxic, levels of contaminants. Preferably the air to be purified initially contains toxic or undesirable contaminants in a concentration of less than 50,000 PPM, more preferably less than 20,000 PPM, and most preferably less than 10,000 PPM. The temperature achieved by the thermal treatment unit portion of the integrated heat exchanger/thermal treatment unit should be in the range of approximately 200° C. to approximately 500° C. A more preferable range is from about 300° C. to about 400° C. While temperatures over 500° C. are certainly effective at destroying or deactivating air contaminants, such higher temperatures require the use of high temperature materials, such as refractory metals, and the use of these more specialized and often more expensive materials in the thermal treatment unit increases both its component and fabrication costs.

The term "organic and/or biological species" as used herein refers to organic chemicals, bacteria, and/or viruses that cause harm, illness, and/or death in humans. Examples of well-known toxic chemicals that are of concern include Sarin, mustard gas (bis(2-chloroethyl)thioether), phosgene, cyanogen chloride, ammonia, and ethylene oxide. Examples of well-known biological agents that are of concern include anthrax spores, bacteria such as *E. coli, salmonella, listeria*, and *legionella*, and viruses such as Norwalk and those that cause hepatitis. In the air purification embodiment, the present invention preferably uses a thermal deactivation process to purify air contaminated with biological toxins such as *E. coli*, and in another embodiment, it purifies air contaminated with toxic chemical agents using a thermocatalytic process.

It is anticipated that the present invention will also be useful in removing chemical or biological contaminants that have an adverse effect on health or on a process, but are not toxic. For example, some biological particulates, such as pollens, are not necessarily toxic, yet cause allergies or aggravate asthma. Similarly, semiconductor fabrication plants can experience quality control problems caused by traces of ammonia that are present in amounts that are not toxic. Food, beverage, or pharmaceutical plants may desire to remove any biological organisms from the air (regardless of whether or not the organisms are pathogens), so that the organisms don't contaminate a product. Thus, it should be understood that the use of the present invention to remove toxic biological and chemical species is merely exemplary, and is not intended to limit the functional application of the invention.

The term "deactivate," with reference to a chemical compound, as used herein and in the claims that follow, means that the compound is oxidized, decomposed, combusted, or otherwise chemically reacted to form species that are less toxic than the contaminant. With reference to biological species, "deactivate" means that the species are made non-viable. The term "less toxic" as used herein means that the less toxic species (at the same exposure level) do not, on average, cause harmful symptoms as severe in humans, as the "toxic" species from which the less toxic species originated.

It is known that many toxic biological species can be deactivated by exposing such species to high temperatures. For example, it is recommended that meat be heated to a temperature of at least 72° C. to ensure that any *E. coli* bacteria in the meat are killed. This concept is employed in the thermal deactivation process used in the present invention, wherein a fluid such as air is heated to a sufficiently high temperature to thermally deactivate a substantial portion of any toxic biological species present in the fluid.

Although the foregoing thermal deactivation process is effective at deactivating biological species, it may not provide a desired level of effectiveness in removing or deactivating certain organic chemical toxins, such as chemical warfare agents. It is well known that many toxic chemicals require extremely high temperatures (e.g., in excess of 750° C.) to fully oxidize such compounds. Experimental research has shown that such compounds can often be effectively deactivated by exposing a fluid containing such organic chemical toxins to certain catalysts at a substantially lower temperature. These catalysts significantly lower the temperature required to deactivate such compounds. This process is referred to as thermocatalytic deactivation process. At least one embodiment of the present invention employs a catalyst to further reduce the energy required to achieve a desired deactivation efficiency.

Functionally, catalysts have the physical property of increasing the speed of or otherwise facilitating a chemical reaction without undergoing any permanent chemical change. They can be recovered after a reaction and used again and again (although most catalysts have finite lifetimes). Furthermore, the chemical nature of the catalyst employed can have a significant effect in selecting reaction channels leading to different chemical products. Catalyst functionality typically involves certain "active sites" in the structure of a catalyst. Adsorption or transient bonding at each active site enables the reacting molecules to undergo a particular chemical transformation at much lower energy levels than would normally be the case in the absence of such sites. Often a catalytic reactor is fabricated to have a relatively high surface area so that the surface can then be coated with a small amount of a catalytically active material, such as a noble metal (often platinum or palladium). Once the reactants adsorb on the surface and encounter active catalyst sites (i.e., locations with catalyst material not already occupied by reactants or products), they typically dissociate into smaller fragments and react with fragments of other adsorbed species. Thermocatalytic processes are processes carried out in the presence of a catalyst at temperatures substantially above ambient, i.e., substantially above 24° C.

Details of an air purification apparatus employing a catalytic reactor are described in commonly assigned, co-pending U.S. patent application Ser. No. 09/422,206, the disclosure and drawings of which are hereby specifically incorporated herein by reference. The following disclosure makes note of the differences between the present invention and this co-pending application, and the following discussion should be relied upon in regard to the present invention, as opposed to the disclosure in the referenced application, where such differences exist.

In embodiments of the present invention that employ thermo-catalytic conversion, the catalytic treatment zone is also integral to the integrated heat exchanger/thermal treatment unit. Preferably, the catalytic treatment zone is disposed adjacent to the thermal treatment zone, because fluid in that portion of integrated heat exchanger/thermal treatment unit will be at a higher temperature than the portions of the integrated heat exchanger/thermal treatment unit that are adjacent to its external surfaces. By ensuring that the catalytic treatment zone is close to the thermal treatment zone, it is more likely that fluid entering the catalytic treatment zone will be at a sufficiently high temperature to ensure that a desired level of deactivation of contaminants is achieved within the catalytic treatment zone.

Also preferably, the catalytic treatment zone comprises a portion of each individual plate of the heat exchanger on which a catalyst has been applied. More preferably, the catalytic treatment zone is in the form of a porous surface coating on the plate over which the heated fluid passes. For example, the catalytic treatment zone may include a platinum-coated surface applied to the plates of the heat exchanger. Examples of such surfaces include porous silica, alumina, or porous metallic "foams," which are all known to those skilled in the art of catalysis. Suitable catalysts include ceramic oxides and noble metals, preferably platinum or palladium.

Details of the Present Invention

A schematic block diagram illustrating the primary components of an exemplary integrated heat exchanger/thermal treatment unit fluid treatment system 10 is shown in FIG. 1. These components include a first fluid port 12, an integrated heat exchanger/thermal treatment unit 14, a prime mover and pump/fan 18, and a second fluid port 16. Note that first fluid port 12 and second fluid port 16 can function as either an inlet port or an outlet port, depending on the direction in which prime mover and pump/fan 18 is driving the fluid, and depending upon whether the pump/fan is pushing or pulling the fluid. For this reason, arrows are included to indicate the various optional directions of fluid flow through the apparatus. Four different types of arrows indicate four different potential fluid paths 15a–15d.

For example, in fluid path 15a, prime mover and pump/fan 18 and second fluid port 16 are disposed downstream of first fluid port 12 and integrated heat exchanger/thermal treatment unit 14. Prime mover and pump/fan 18 pull untreated fluid into integrated heat exchanger/thermal treatment unit 14 via first fluid port 12. The treated fluid exiting integrated heat exchanger/thermal treatment unit 14 is pulled into prime mover and pump/fan 18, and that treated fluid is then pushed out of the system via second fluid port 16. Fluid path 15c represents a second fluid path in which prime mover and pump/fan 18 is disposed downstream of integrated heat exchanger/thermal treatment unit 14, and in which fluid is pulled through the integrated heat exchanger. In fluid path 15c, first fluid port 12 is also disposed downstream of the integrated heat exchanger. Prime mover and pump/fan 18 pull untreated fluid into integrated heat exchanger/thermal treatment unit 14 via second fluid port 16. The treated fluid exiting the integrated heat exchanger is pulled into prime mover and pump/fan 18, and that treated fluid is then pushed out of the system via first fluid outlet 12.

As noted above, prime mover and pump/fan 18 can also be used to push fluid through integrated heat exchanger/thermal treatment unit 14, rather than to pull fluid through the integrated heat exchanger. To achieve this, prime mover and pump/fan 18 is disposed upstream, rather than downstream, of integrated heat exchanger/thermal treatment unit 14. In fluid path 15b, prime mover and pump/fan 18 and second fluid port 16 are disposed upstream of first fluid port 12 and integrated heat exchanger/thermal treatment unit 14. Prime mover and pump/fan 18 pull untreated fluid from second fluid port 16, and then push that untreated fluid into integrated heat exchanger/thermal treatment unit 14. The treated fluid exiting integrated heat exchanger/thermal treatment unit 14 is discharged via first fluid outlet 12. Fluid path 15d represents a second fluid path in which prime mover and pump/fan 18 is upstream of integrated heat exchanger/thermal treatment unit 14, and in which fluid is pushed through the integrated heat exchanger, rather than pulled through. In fluid path 15d, first fluid port 12 is also disposed upstream of integrated heat exchanger/thermal treatment unit 14. Prime mover and pump/fan 18 pull untreated fluid from first fluid port 12, and then push that untreated fluid into integrated heat exchanger/thermal treatment unit 14. The treated fluid exiting integrated heat exchanger/thermal treatment unit 14 is discharged from the system via second fluid port 16.

As noted above, the thermal treatment can be provided by a chiller that removes a condensable liquid from a fluid, or by a heater that heats the untreated fluid to a temperature required to achieve a desired result (such as deactivating a contaminant entrained within the fluid). Thus, as noted above, the thermal treatment unit portion of integrated heat exchanger/thermal treatment unit 14 can include either a chiller or a heater. The heat exchanger portion of integrated heat exchanger/thermal treatment unit 14 is a high-efficiency heat exchanger that exchanges thermal energy between an untreated fluid and a treated fluid flowing through adjacent fluid channels. Regardless of whether the thermal treatment unit is a chiller or a heater, the exchange of thermal energy between the treated fluid and the untreated fluid reduces the energy required by the thermal treatment unit to modify the temperature of the untreated fluid to a temperature required to achieve the desired result.

While other types of counterflow heat exchangers (such as a tube-in-tube configuration) can be employed, preferably the heat exchanger portion of integrated heat exchanger/thermal treatment unit 14 is a counterflow stacked plated heat exchanger, such as a heat exchanger 20 shown in FIG. 2. In this Figure, a plurality of stacked thin sheets 22 are separated by spacers 24, thereby forming gaps 26 between adjacent thin sheets. The gaps define alternating treated and untreated fluid channels. In this configuration, an untreated fluid channel is disposed next to at least one treated fluid channel, thereby enabling thermal energy to be readily transferred between treated and untreated fluids that respectively flow in the treated and untreated fluid channels. Proximate the center of each thin sheet 24 is disposed an elongate orifice 28. The orifices formed in different thin sheets are aligned when the thin sheets are stacked, to form a thermal treatment unit void region 30. While not shown in this view, the thermal treatment unit void region is sized and thereby adapted to receive a thermal treatment unit used to modify the temperature of a fluid flowing through the thermal treatment unit void region of the integrated heat exchanger/thermal treatment unit.

A portion 32 of a countercurrent stacked plate heat exchanger in FIG. 3 clearly shows the countercurrent flow that occurs in the present invention. A stream 34 of untreated fluid and a stream 36 of treated fluid simultaneously flow through alternating gaps 26. Stream 34 of untreated fluid flows from a source of untreated fluid toward the thermal treatment unit, while stream 36 of treated fluid flows in the opposite direction, from the thermal treatment unit toward a treated fluid discharge. Note that a header system (not shown in FIG. 3) will typically be included to separate the treated and untreated fluid streams. A preferred header system is discussed in detail below.

An important aspect of the present invention corresponds to the design of the heat exchanger portion of integrated heat exchanger/thermal treatment unit 14. Preferably, the dimensions of gaps 26 that form the treated and untreated fluid channels are "meso" in scale. That is, preferably the height of each gap is between 0.01 mm and 10 mm, and is most preferably between 0.5 mm and 5 mm. Fluid channels (i.e. gaps 26) of the foregoing preferred dimensions are herein referred to as mesochannels, because they are within a mesoscale system range in size. By definition, mesoscale systems fall between the macroscale systems associated with traditional full-sized heat exchange systems, like those used in the petrochemical industry, and the microscale systems commonly encountered in the microelectronics industry. Empirical studies have substantiated that heat exchangers fabricated from the above dimensions are particularly efficient at transferring thermal energy between treated and untreated fluid streams.

Generally, the plates that form a stacked plate heat exchanger are selected to have good thermal conductivity. Somewhat surprisingly, preferably the material selected to fabricate the plates of the heat exchanger portion of integrated heat exchanger/thermal treatment unit 14 is intentionally not a particularly good thermal conductor. First, it must be noted that thin sheets 22 are very thin, so thin that the thermal conductivity of the material is largely irrelevant with respect to transferring thermal energy through the thin sheet, from one fluid channel to an adjacent fluid channel. With a material thickness of less than 0.5 mm, even materials that are normally considered thermal insulators will permit good heat transfer to take place between treated and untreated fluids flowing through adjacent fluid channels, because of the thinness of the sheets. As will be described more in detail below, in one embodiment of the present invention used to purify air, at least one face of the integrated heat exchanger/thermal treatment unit is exposed to ambient air. If the thin sheets were fabricated from a thermally conductive material, the resulting longitudinal heat conduction will decrease the heat exchanger performance according to mechanisms well known in the art of heat exchanger design. Such a loss of thermal energy would provide no benefit, and would increase the power consumption of the thermal treatment unit required to achieve a desired temperature within the thermal treatment zone.

It is therefore preferable for the thin sheets to be fabricated from a material that is not particularly thermally conductive. Ceramic materials exhibit desirable thermal conductivity characteristics, but such materials are difficult to fabricate in the desired thin sheet configuration. Materials such as copper, brass, and aluminum can easily be fabricated into thin sheets, but are generally too thermally conductive. Stainless steel is easy to fabricate into thin sheets, has excellent resistance to chemicals, and is less thermally conductive than copper, brass, and aluminum. A thin stainless steel foil has been successfully used to fabricate a prototype integrated heat exchanger/thermal treatment unit with good results. The thickness of the foil used for the stainless steel sheets in the prototype unit is only about 25 μm.

A top plan view of heat exchanger 20 is shown in FIG. 4. Preferably orifice 28 is disposed generally proximate the center of thin sheet 22, although in other embodiments, orifice 28 is disposed closer to one edge of thin sheet 22, as discussed below in regard to FIGS. 25A and 25B, and 26A and 26B. The central positioning of orifice 28 is expected to reduce heat transfer between the thermal treatment unit disposed in orifice 28 and the ambient environment, and it should enable fluid to enter the thermal treatment zone adjacent to orifice 28 from two sides instead of one, thereby increasing the volume of fluid that can be thermally treated. This configuration is clearly illustrated in FIG. 5. Note that portion 32 of heat exchanger 20 can also be seen in FIG. 4.

In FIG. 5, a thermal treatment unit 38 is disposed in thermal treatment unit void region 30 (see FIG. 2), formed by aligned orifices 28 in the stacked sheets. As noted above, thermal treatment unit 38 can be a chiller or a heater, depending on whether the thermal treatment desired requires chilling the fluid, e.g., for removing a condensable liquid from the fluid, or heating the fluid, e.g., to deactivate a contaminant. A thermal treatment zone 39 extends around thermal treatment unit 38. The thermal treatment zone represents a region in which required temperature conditions are established by thermal treatment unit 38. Thus, any fluid entering thermal treatment zone 39 will be thermally treated. Streams of untreated fluid 34 enter thermal treatment zone 39 from alternating gaps 26. Treated fluid streams 36 then exit thermal treatment zone 39 through adjacent gaps 26. As will be described in more detail below, each of either untreated fluid streams 34, or each of treated fluid streams 36, are preferably driven by prime mover and pump/fan 18 (FIG. 1) through a header system (see FIGS. 6–9 and 13–17).

Note that a portion of each thin sheet 22 defining orifice 28 extends somewhat into thermal treatment zone 39. As previously noted, a generally poor thermal conductor is preferred for the material used in fabricating thin sheets 22, to minimize heat transfer concerns along the length of each thin sheet. If the material used to fabricate thin sheets 22 was a good thermal conductor, then a significant amount of thermal energy would be transferred from thermal treatment zone 39 toward the ambient temperature end of the thin sheets. This longitudinal conduction can have a deleterious effect on heat exchanger performance.

As discussed above, the size of the fluid channels defined by the thin sheets is very important. Preferably, the size of these channels/gaps should be in the range of approximately 0.5 mm to approximately 2 mm in height, falling within the mesochannel range discussed above. It can be shown mathematically that for any given mass flow rate and any given fluid, heat exchanger efficiency increases as the fluid channels (i.e. gaps 26) become smaller in height, and the efficiency reaches unity as the hydraulic diameter approaches zero. Unfortunately, the pressure drop (i.e., change in fluid pressure as the fluid traverses the length of the fluid channel) increases very rapidly as the cross section of the channel decreases. Thus, the heat exchanger designer must consider the tradeoff between increased efficiency and its corresponding pressure drop penalty. After a certain point, a small improvement in efficiency will require a substantial increase in the pressure drop.

Experimental testing has shown that that mesochannel heat exchangers provide superior performance over conventional macrochannel heat exchangers. Mesochannel heat exchangers have been shown to provide heat transfer rates in excess of 1000 W/m$^2$K, and efficiencies in excess of 90%. In contrast, conventional macrochannel heat exchangers typically provide maximum efficiencies of approximately 70%. In addition to increased efficiencies, mesochannel heat exchangers require significantly less space and weight than conventional macrochannel heat exchangers.

It will be understood by those skilled in the heat exchanger art that the performance of a specific heat exchanger configuration depends on the fluid being processed and other parameters, including mass flow rates, temperatures, materials, etc. In addition, the optimum channel size for a particular application may deviate slightly from the foregoing specified range when additional effects are considered, including axial heat conduction losses, material surface roughness, non-laminar flow conditions, etc.

Scavenger Type Air Purification Embodiment

A first exemplary preferred embodiment of the present invention is intended to function as a large volume air purification device, commonly known as a "scavenger." An integrated scavenger 40 in accord with the present invention is shown in FIG. 6. An axial fan 42 is disposed in a plenum chamber 55 mounted on the top of scavenger 40. A plurality of half-tube shaped headers 44 are in fluid communication with both axial fan 42 and plenum chamber 48. Insulating panels 50 are mounted to the top, bottom, and two opposite sides of the integrated heat exchanger and thermal treatment unit comprising scavenger 40. Preferably, insulating panels 50 are fabricated from vacuum-formed aerogel, which not only provides excellent insulation, but is also extremely lightweight. The heat exchanger portion of scavenger 40 is assembled from a plurality of stacked thin sheets 22, which are stacked using a plurality of spacers 24 so as to form a plurality of gaps between adjacent thin sheets 22 (as described above with respect to FIG. 2). Note that these gaps are of two distinct types. Gaps 26a are in fluid communication with ambient air ports 52, while gaps 26b are in fluid communication with headers 44. Gaps 26a and 26b are disposed in alternating relationship throughout the stack, such that a gap 26a is always adjacent to at least one gap 26b. Gaps 26a and 26b comprise treated and untreated fluid channels, depending upon the operation of axial fan 42, as will be described below. Note that ambient air ports 52 are disposed at the opening into gaps 26a and are not equivalent. Gaps 26a represent the entire region defined between an upper thin sheet and a lower thin sheet, while ambient air ports 52 comprise the outer ends of each gap 26a that are exposed to ambient air.

During operation, air enters scavenger 40 through either a plurality of alternating ambient air ports 52 or a plurality of blower air ports 54, depending on the mode in which axial fan 42 is operating (i.e., whether it is pushing or pulling air through the scavenger). Assuming that untreated air enters scavenger 40 via ambient air ports 52, it will be drawn into the interior of the scavenger, entering thermal treatment zone 39 (see FIG. 5). After passing through thermal treatment zone 39, the thermally treated air flows in a counter current fashion into an adjacent gap 26 (see the arrows in FIG. 5), then into headers 44, through plenum 48, and will then be exhausted via blower air ports 54, as shown in FIG. 6. In this case, gaps 26a comprise untreated fluid channels, while gaps 26b comprise treated fluid channels.

If the direction of axial fan 42 is reversed, untreated air enters scavenger 40 via blower air ports 54, and the axial fan forces the untreated air into plenum 48 and through headers 44. The untreated air enters every other gap (i.e., gaps 26b that are in fluid communication with headers 44), and is forced into the interior of the scavenger, through thermal treatment zone 39 (see FIG. 5). After passing through thermal treatment zone 39, the treated air flows in a counter current fashion into adjacent gaps 26a, which are in fluid communication with ambient air ports 52, and is then exhausted via the ambient air ports. It will be evident that in this mode of operation, gaps 26a function as treated fluid channels, while gaps 26b function as untreated fluid channels.

It should also be noted that the axial fan can be disposed at other points, if additional headers are provided, to either push or draw air through the apparatus. Furthermore, other means of driving air through scavenger 40 can be employed, besides axial fan 42. In one preferred embodiment, a centrifugal fan blower (not separately shown) is employed instead of an axial fan, because centrifugal fan blowers can provide higher pressure than axial fans can. For embodiments in which operating pressure is not a concern, an axial fan is preferred. It should be noted that if a centrifugal fan blower is employed in place of axial fan 42, that merely reversing the direction of the centrifugal fan blower motor may not cause air to enter scavenger 40 via blower air ports 54 rather than ambient air ports 52. Depending on the design and pitch of the fan blades in a centrifugal fan blower, reversing the direction of rotation of a centrifugal fan blower may or may not achieve a reversal in air flow through scavenger 40. Those of ordinary skill in the art will recognize that, depending on the type of centrifugal fan blower employed, the position of air ports 54 relative to a centrifugal fan blower used to replace axial fan 42, may need to be altered to achieve a reversal of the air flow within scavenger 40 when the direction of the centrifugal fan blower is similarly reversed.

A plurality of fluid-blocking structures 46 are positioned so as to place alternate gaps that are in fluid communication with either headers 44 or the ambient atmosphere (via ambient air ports 52). Fluid-blocking structures 46a and 46b, in conjunction with headers 44, ensure that treated and untreated air are exhausted via the appropriate ports, depending on the direction in which axial fan 42 is moving the air. Fluid-blocking structures 46a prevent gaps 26b, which are in fluid communication with headers 44, from also being in fluid communication with ambient air ports 52. A header 44a is shown in phantom view, enabling fluid-blocking structures 46b to be more clearly seen. Fluid-blocking structures 46b prevent gaps 26a, which are in fluid communication with ambient air ports 52, from also being in fluid communication with headers 44. Fluid-blocking structures 46a and 46b are discussed in detail below, with respect to FIGS. 24A–24B and 25A–25B. Note that fluid-blocking structures 46a and 46b have been shown as shaded elements to differentiate fluid-blocking structures 46a and 46b from ambient air ports 52, and not to indicate a cross-sectional view.

Headers 44 and header 44a are identical, the only difference being that header 44a is shown in phantom view to enable fluid-blocking structures 46b to be more clearly seen. It should be understood that fluid-blocking structures 46b are similarly disposed in all of headers 44. Note that headers 44 are disposed on opposing sides of scavenger 40. This configuration corresponds with the fluid flow illustrated in FIG. 5, the difference being that the fluid flow into headers 44 is not shown in FIG. 5. It will be understood that the number of headers 44 can be varied as desired. Regardless of the number of headers 44 employed, the aggregate volume of headers 44 should be able to accommodate the desired flow rate of air through the scavenger.

Axial fan 42 includes a prime mover or electric motor 56 and the plurality of blower air ports 54, as noted above. Note that with motor 56 rotating in a first direction, air will be drawn into the scavenger via blower air ports 54 and exhausted via ambient air ports 52. When the direction of motor 56 is reversed, air will be drawn into the scavenger via ambient air ports 52 and exhausted via blower air ports 54.

FIGS. 7–15 provide details on a second embodiment of a scavenger. Scavenger 41 employs six headers, rather than the eight headers of scavenger 40. Aside from the number of headers, scavengers 40 and 41 are quite similar and are functionally equivalent. Axial fan 42, motor 56, plenum 48, and headers 44 are visible in a top plan view of scavenger 41 in FIG. 7. The alternating configuration of gaps 26a and 26b that comprise fluid channels for treated and untreated air are clearly seen in FIG. 8, which shows a header 44b in phantom view to clearly illustrate the relationship between fluid-blocking structures 46a and 46b. Note that both a front face and a rear face of scavengers 40 and 41 preferably incorporate headers 44, and that gaps 26a (in fluid communication with ambient air ports 52) on both the front face and rear face of both scavengers 40 and 41 are exposed to the ambient atmosphere. Thus, untreated air can enter scavenger 40 and 41 (or treated air can exit, depending on the direction in which motor 56 drives the axial fan) through the plurality of ambient air ports 52 on either the front or the back face of scavenger 40 and 41. In this embodiment, the front and rear faces of scavengers 40 and 41 are identical. The two side faces are covered with insulated panels 50, as can clearly be seen in FIGS. 6 and 9. Individual thin sheets 22 and spacers 24 can also be seen in FIG. 8.

FIG. 10 illustrates a preferred embodiment of a thin sheet 22a. Instead of including a single orifice 28 disposed proximate its center, thin sheet 22a has a plurality of orifices 28a generally aligned along a center axis of the thin sheet. As noted above, the thermal treatment unit of the integrated heat exchanger/thermal treatment unit of the present invention can be either a chiller or a heater. However, since scavengers 40 and 41 are used for air purification, the thermal treatment unit portion of scavengers 40 and 41 comprises a heater. Preferably, the heater is an electric-resistive heating element, as shown in FIGS. 11 and 12.

A preferred heater 38a comprises a base 58, a plurality of electric-resistive heating elements 60, and a frame 62. If heating elements 60 of heater 38a are strong enough to support their own weight, then frame 62 is not required. Note that heating elements 60 are designed to fit within orifices 28a of thin sheet 22a, shown in FIG. 10. It should be understood that as long as the thermal treatment unit can fit within the aligned orifices in the thin sheets, alternative configurations of orifices and thermal treatment units can instead be employed.

Heating element 60 is also clearly visible in FIG. 13. Also visible in this Figure are top and bottom insulated panels 50, plenum 48, headers 44, axial fan 42, and motor 56. Note that no fluid-blocking structures are positioned to prevent air from being in fluid communication with ambient air ports 52. However, in gaps 26b, fluid-blocking structures 46a are disposed to prevent air within gaps 26b from being in fluid communication with the ambient air adjacent to front face 64 and rear face 66. The positions of fluid-blocking structures 46a (see FIG. 8) ensure that gaps 26b are in fluid communication with headers 44.

The purpose of headers 44 is to direct the flow of air to (or from) the axial fan or centrifugal fan blower employed to drive air through the apparatus. Without at least one header, it is difficult to place an axial fan or centrifugal fan blower in fluid communication with the apparatus. A less important benefit of using a header system is to ensure that treated and untreated air are not drawn from and exhausted into the same portion of an ambient space. If scavengers 40 or 41 are placed in a sealed room, the treated and untreated air are drawn from and exhausted into the same volume of air. However, by employing headers 44, it will be evident that ambient air ports 52 and blower air ports 54 are in fluid communication with different regions within the same volume of air within the room. When the volume of air is large compared to the size of the scavenger, enabling ambient air ports 52 and blower air ports 54 to be in fluid communication with different regions within the same volume of air slightly improves the efficiency of the scavenger. If no header system is employed, and treated air is exhausted into the same region from which untreated air is drawn (see FIG. 5), the scavenger would require more time to treat the entire volume of air within the room, because the air drawn into the apparatus will likely include more of the air that has already been treated. However, this aspect of the apparatus is a relatively minor concern, as scavengers are normally operated over a relatively long period of time, and it is expected that the same volume of air will be passed through a scavenger numerous times.

Figure 14:
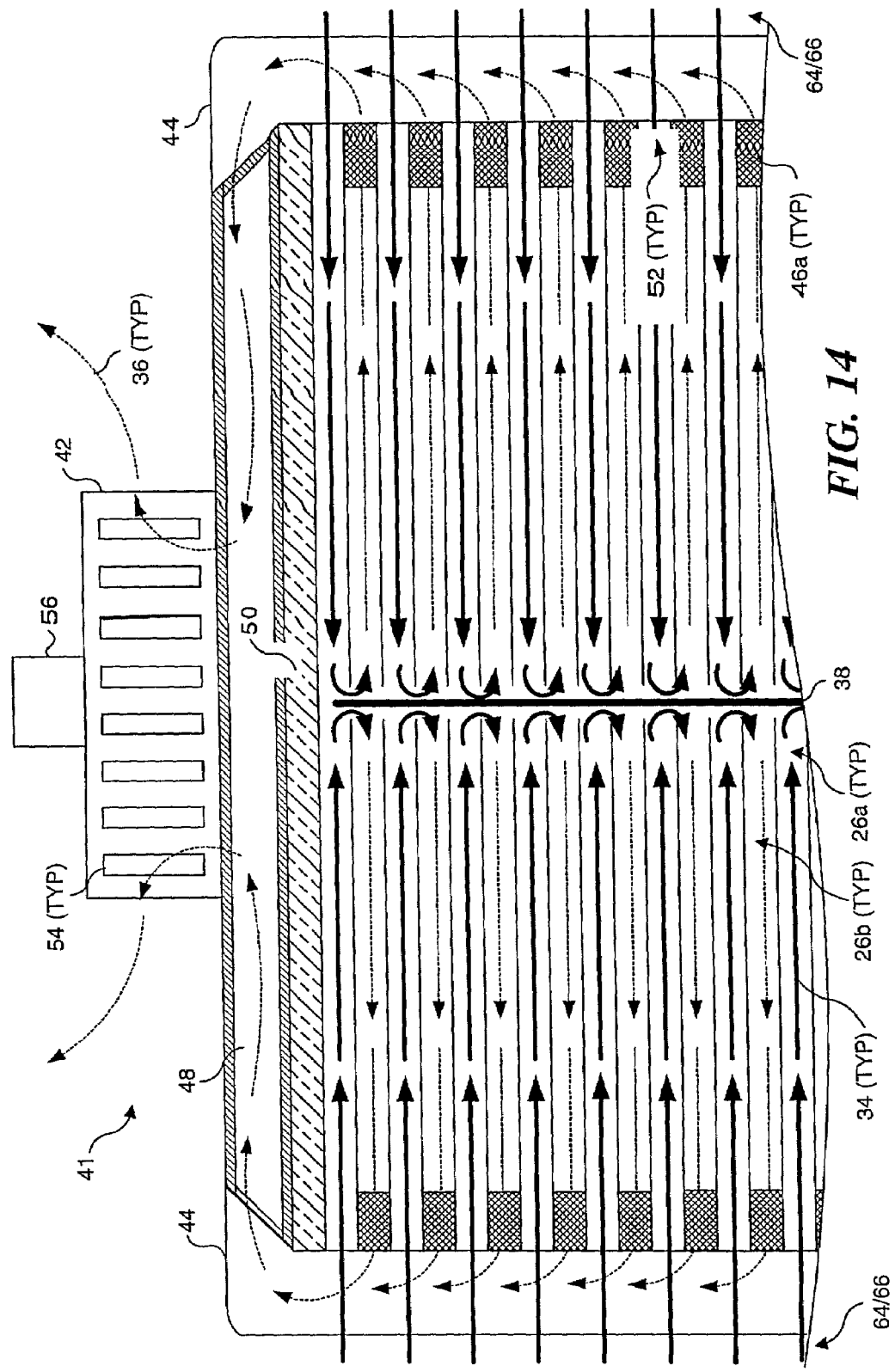
FIG. 14 is an enlarged view of a portion of the cross-sectional view of FIG. 13, showing the flow path of contaminated air.
Figure 15:
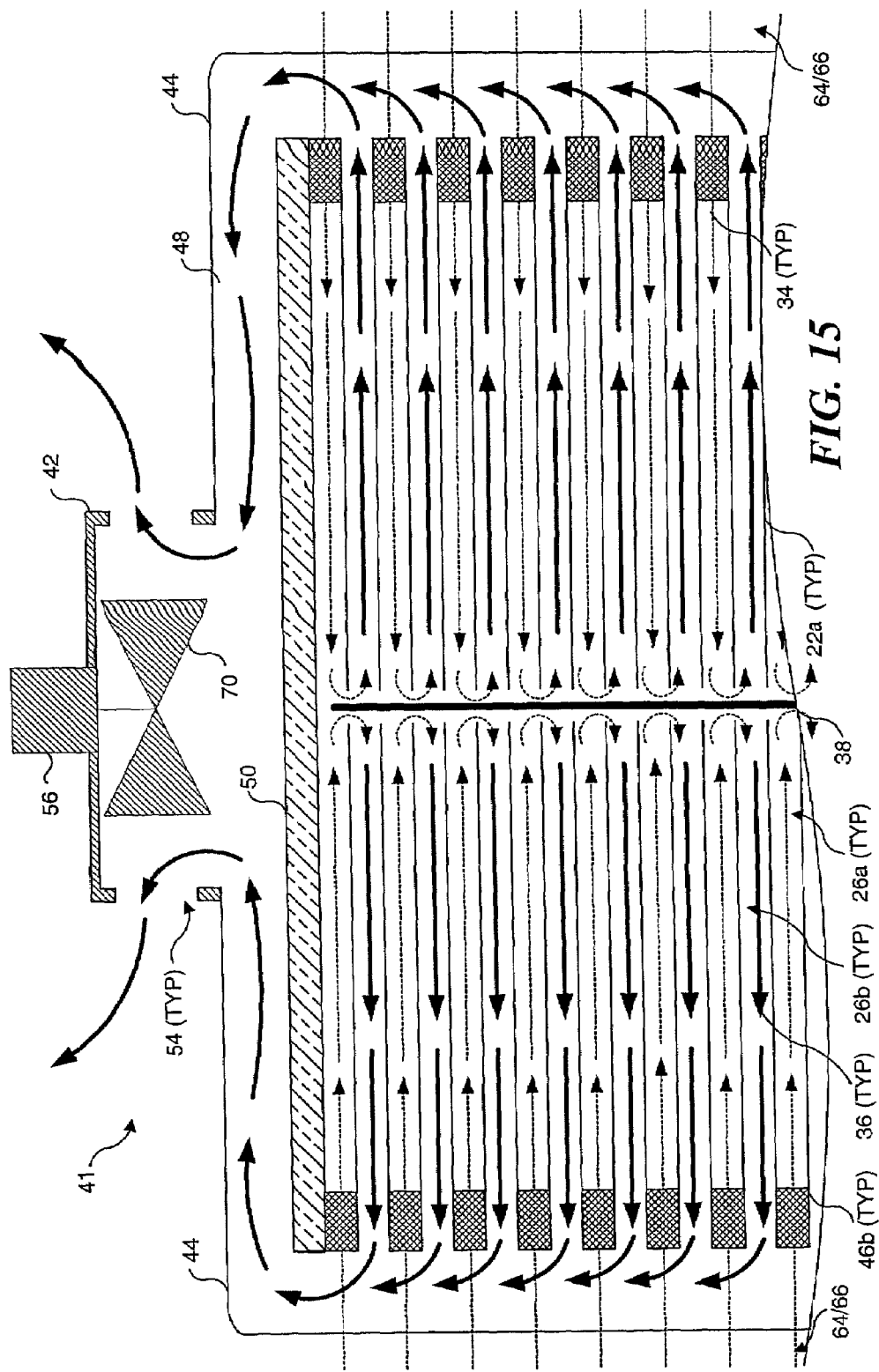
FIG. 15 is an enlarged view of a portion of a cross-sectional view of the air purification apparatus, taken along section line C—C of FIG. 7, showing the flow path of decontaminated air.
Figure 16:
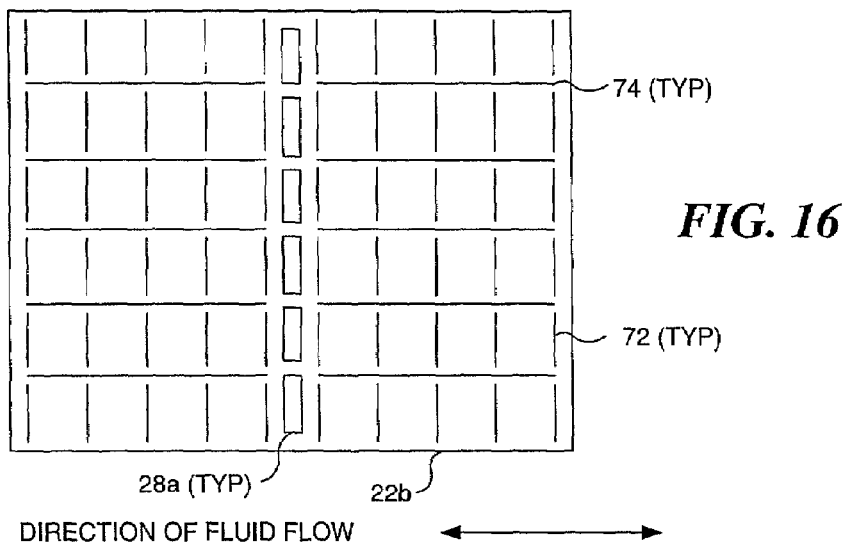
FIG. 16 is a top plan view of an embodiment of a thin sheet used in the apparatus showing the stiffening elements.

FIGS. 14 and 15 are enlarged cross-sectional portions of scavenger 41, illustrating how air is drawn into the scavenger and then exhausted. In both Figures, it is assumed that air is drawn into scavenger 41 via ambient air ports 52, and exhausted via blower air ports 54. As noted above, by reversing motor 56 and the mode of operation of axial fan 42, air can instead be drawn into blower air ports 54 and exhausted via ambient air ports 52, and the directions of the arrows representing air flow in FIGS. 14 and 15 would then be reversed. It should also be understood that although scavenger 41 employs a different number of headers, the air flow paths described in FIGS. 14 and 15 are also applicable to scavenger 40. Note that if a centrifugal fan blower is employed rather than an axial fan, the locations of blower air ports 54 may need to be adjusted.

In FIG. 14, ambient air is being drawn into scavenger 41 through ambient air ports 52 disposed adjacent to front face 64 and rear face 66. The arrows in the bold font illustrate the air flow through the apparatus. Note that front face 64 and rear face 66 are identical. Air is drawn into gaps 26a and flows towards the center of the apparatus, where it comes into contact with thermal treatment unit 38. As discussed above, in an air purification apparatus, thermal treatment unit 38 is preferably an electrically powered resistive heater. Note that fluid-blocking structures 46a disposed at each end of gaps 26b prevent treated air from exiting scavenger 41 via front face 64 and rear face 66. As can be seen in FIG. 8, fluid-blocking structures 46a are disposed across all of front face 64 and rear face 66 in gaps 26b, except for those portions of gaps 26b that are in fluid communication with headers 44. Thus when air is drawn into scavenger 41 via ambient air ports 52 and gaps 26a, treated air is directed into headers 44 via fluid-blocking structures 46a and gaps 26b.

In FIG. 15, treated air moving out of the thermal treatment zone adjacent to thermal treatment unit 38 flows into gaps 26b, and into headers 44, through plenum 48, and is then exhausted from scavenger 41 through blower air ports 54. Fluid-blocking structures 46b in gaps 26a ensure that gaps 26a are in fluid communication with ambient air ports 52 (visible in the sectional view of FIG. 14), and not with headers 44. Motor 56 drives a centrifugal fan 70 that provides the motive force causing the fluid (i.e., air) to flow through the apparatus. If the direction of rotation of centrifugal fan 70 is reversed, the flow of fluid through the apparatus is also reversed.

As noted above, the preferred material used to fabricate thin sheets 22 is a stainless steel foil. Such a material is quite flexible, and in one preferred embodiment, stiffening elements are added to the foils to reduce the flexibility of the material. Specifically, in a thin sheet 22b shown in FIG. 16, both stiffening ribs 72 (substantially perpendicular to the direction of the airflow) and stiffening ribs 74 (substantially parallel to the direction of the airflow) are provided. Preferably, these features are stamped into the stainless steel foil. The stiffening features do not extend significantly into the gaps between adjacent stacked plates. Preferably, these stiffening features extend only approximately 10% of the height of the gaps between adjacent thin sheets. Thus, if the gap between adjacent thin sheets is 2.0 mm in height, the stiffening element protrudes no more than 0.2 mm into the gap. This limit is especially important for stiffening ribs 72, because if such elements do protrude too far into the gap between adjacent thin sheets, the perpendicular relationship of these elements to the flow of fluid through the apparatus would thus cause the laterally extending elements to impede the flow of fluid through the apparatus.

Figure 17:
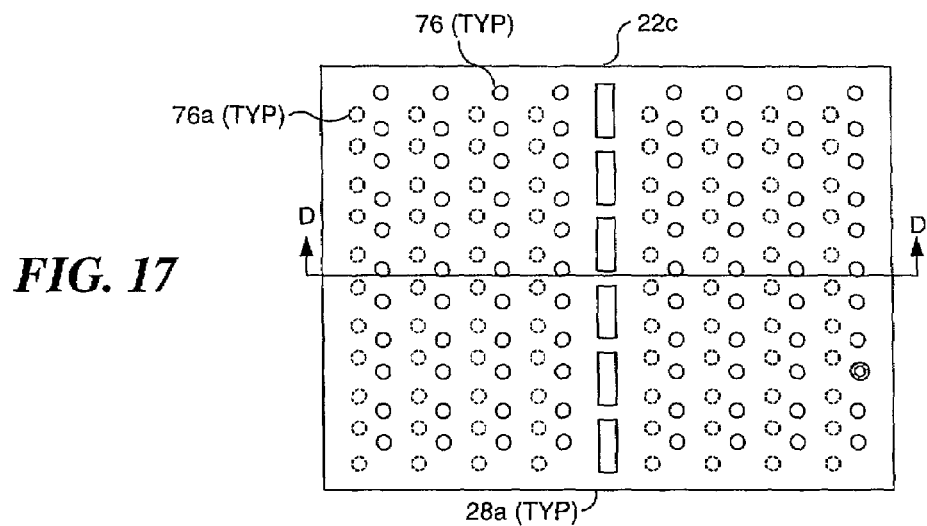
FIG. 17 is a top plan view of a thin sheet of a stacked plate countercurrent heat exchanger and thermal treatment apparatus, showing the surface features that separate adjacent sheets to form the gaps that comprise fluid channels.

A thin sheet 22c shown in FIG. 17 includes surface features that enable consistent spacing to be maintained between adjacent thin sheets. As illustrated in FIG. 2, spacers 24 are disposed between opposing faces of the plates in stacked plate heat exchanger 20. With extremely flexible metal foils, it is anticipated that the peripheral spacers would be ineffective in the more central portions of each thin sheet (that are not supported by spacers 24), because the thin foil sheets can readily flex such that the spacing between the more central portions of adjacent thin sheets will likely not be the same as the spacing at the edges. This flexing can be either a downwardly sagging effect due to gravitational force acting on the thin sheets, or can include an upward flexing motion caused by pressure differentials acting on adjacent thin sheets. To avoid this flexing problem, a plurality of dimples 76 are formed into thin sheet 22c, extending outwardly from the planar surface of the sheet. Preferably, these dimples are the same height as the desired spacing or height of the gap desired between the thin sheets. The dimples provide support for the non-peripheral portions of the thin sheets. If a desired spacing between adjacent thin sheets is about 2.0 mm, the dimples should be about 2 mm in height. Preferably dimples 76 are formed by stamping these surface features into the thin metal foil comprising each thin sheet. Note that such dimples should be disposed at different positions on adjacent thin sheets, otherwise the dimples would "nest" and not provide the desired spacing. If the dimples are stamped into each thin sheet, they can be disposed in a uniform pattern that is slightly off center with respect to the central transverse axis of the thin sheets. When the stack of thin sheets is assembled, adjacent thin sheets will be rotated by 180 degrees, causing the slightly off-center pattern to be staggered on adjacent sheets, preventing the nesting effect described above. In FIG. 17, dimples 76, which are shown as dashed lines, illustrate a pattern of dimples that is rotated by 180 degrees relative to the pattern of dimples shown as solid lines.

Figure 18:
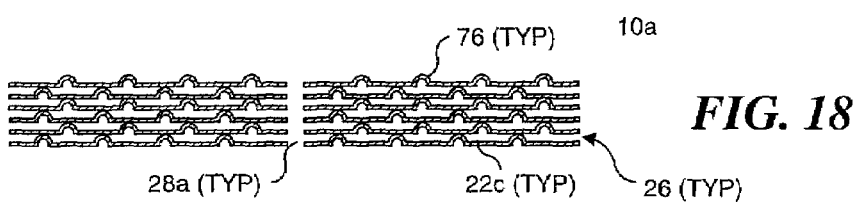
FIG. 18 is a cross-sectional side view of the stacked plate countercurrent heat exchanger and thermal treatment apparatus, taken along section line D—D of FIG. 17.

FIG. 18 shows a plurality of thin sheets 22c, each including a plurality of dimples 76; the sheets are stacked atop one another to form an integrated heat exchanger/thermal treatment unit. The desired thermal treatment unit can be placed in the thermal treatment void formed by aligned orifices 28a, and dimples 76 ensure that the desired spacing between adjacent thin sheets is achieved over substantially the entire surface area of the thin sheets.

Figure 19:
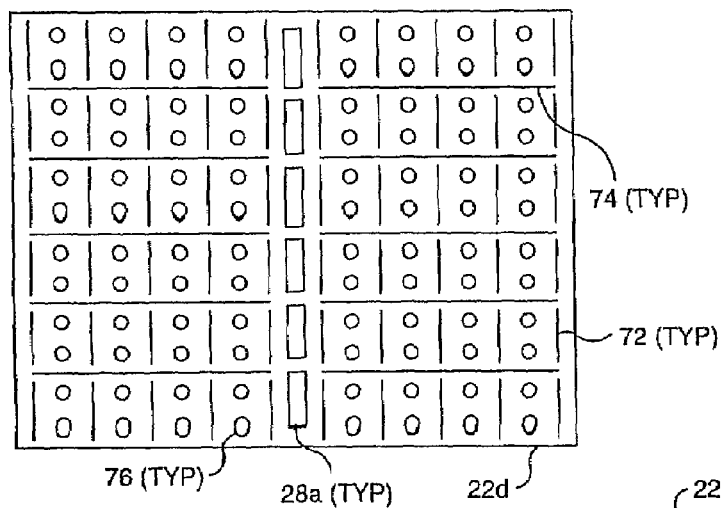
FIG. 19 is a top plan view of a preferred thin sheet that includes both stiffening elements and surface features.

In a most preferred embodiment of a thin sheet 22d shown in FIG. 19, both dimples 76 and latitudinal stiffening ribs 72 and longitudinal stiffening ribs 74 are provided. Thin sheet 22d also includes a plurality of orifices 28a disposed proximate the center of the thin sheet. As described above, fluid will be drawn across each thin sheet from opposing sides towards the center of the thin sheet. For thin sheets representing treated fluid channels, the treated fluid moves from the center of the thin sheet towards the opposite sides.

For scavengers 40 and 41, the seal achieved between spacers 24 and adjacent thin sheets 22 is not critical. Some leakage around the edges can be tolerated. It is anticipated that as long as the sealing surfaces are clean and smooth, joining the spacers and thin sheets by using pressure will provide a properly functioning scavenger. High-temperature sealants can be employed between the spacers and the thin sheets, as long as the sealants are selected to tolerate the anticipated operating temperatures. The thin sheets and spacers can also be joined using conventional brazing techniques, although such methods are less preferred because they are likely to significantly increase fabrication expenses. A working prototype scavenger that was fabricated using pressure to join the spacers and thin sheets has been successfully tested. For integrated fluid thermal treatment units that require tighter seals (such as units intended to thermally treat liquids), a leak-proof seal must be provided, and it is likely that welding and brazing techniques will be employed in fabricating such apparatus.

Figure 20:
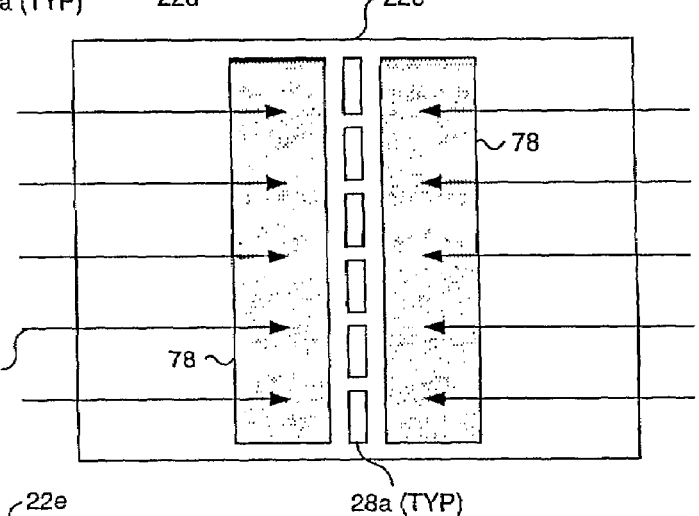
FIG. 20 is a top plan view of a thin sheet that includes a catalytic treatment zone.

As discussed above, incorporating an appropriate catalytic material within a scavenger reduces the temperature required to deactivate many chemical contaminants. A thin sheet 22e shown in FIG. 20 includes a catalytic treatment zone 78 that is disposed adjacent to orifices 28a, such that untreated fluid entering an untreated fluid channel defined by thin sheet 22e first flows through catalytic treatment zone 78 before entering the thermal treatment zone adjacent to the thermal treatment units disposed in the orifices. It should be noted that when assembling an integrated heat exchanger/thermal treatment unit from thin sheets 22e, optionally, only those thin sheets that define an untreated fluid channel are required to incorporate catalytic treatment zone 78. However, because the movement of fluid throughout scavengers 40 and 41 can be reversed, if such a reversibility is desired, then each thin sheet in the integrated heat exchanger/thermal treatment unit of a scavenger should include a catalytic treatment zone on it, so that untreated fluid 34 flows through a catalytic treatment zone before entering a thermal treatment zone. It should also be noted that the catalytic treatment zone can alternatively be implemented in only the treated fluid channels or in both the treated and untreated fluid channels. Since the catalytic treatment zone is disposed adjacent to the thermal treatment zone, the fluid is sufficiently hot when it passes over the thermal treatment zone in either or both of the untreated and treated fluid channels to experience the catalytic conversion produced by the selected catalyst that is included therein. The catalyst can be coated onto the thin sheets, or alternatively dispersed within the fluid channels, such as on a powdered alumina support (as in a packed bed reactor), or the catalyst can be coated on a three dimensional foamed metal substrate that is disposed within a fluid channel.

Instead of, or in addition to, including catalytic treatment zone 78 on some or all of the thin sheets of the integrated heat exchanger and thermal treatment unit, it is envisioned that an adsorption treatment zone (not separately shown) can similarly be included on the thin sheets as desired. For example, acid gases are often generated when chemicals are thermally deactivated. Including an acid gas adsorbent on the thin sheets defining treated air fluid channels should help to remove any acid gases that are generated, so that the acid gases are not exhausted from the thermal treatment unit with the treated air. As noted above with respect to the catalytic treatment zones, if the scavenger is to be reversible, then the acid gas adsorbent should be disposed on all thin sheets.

Figure 21:
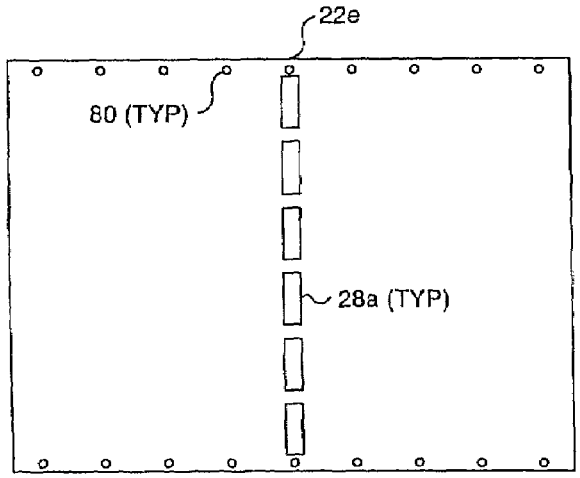
FIG. 21 is a top plan view of a thin sheet that includes positioning holes to aid in assembling thin sheets into a stacked plate countercurrent heat exchanger.

It is anticipated that positioning elements will preferably be included on each thin sheet to aid in assembling a plurality of thin sheets into an integral stacked plate heat exchanger and thermal treatment unit. A thin sheet 22e shown in FIG. 21 includes a plurality of positioning orifices 80. When assembling a plurality of these thin sheets that are stacked atop one another to form an integrated heat exchanger/thermal treatment unit, a base plate will preferably be provided that includes a plurality of positioning rods (neither the base plate or rods are separately shown) of a size and shape corresponding to positioning orifices 80. It should be noted that spacers 24 (illustrated in FIG. 2) may similarly include positioning holes.

Figure 22A:
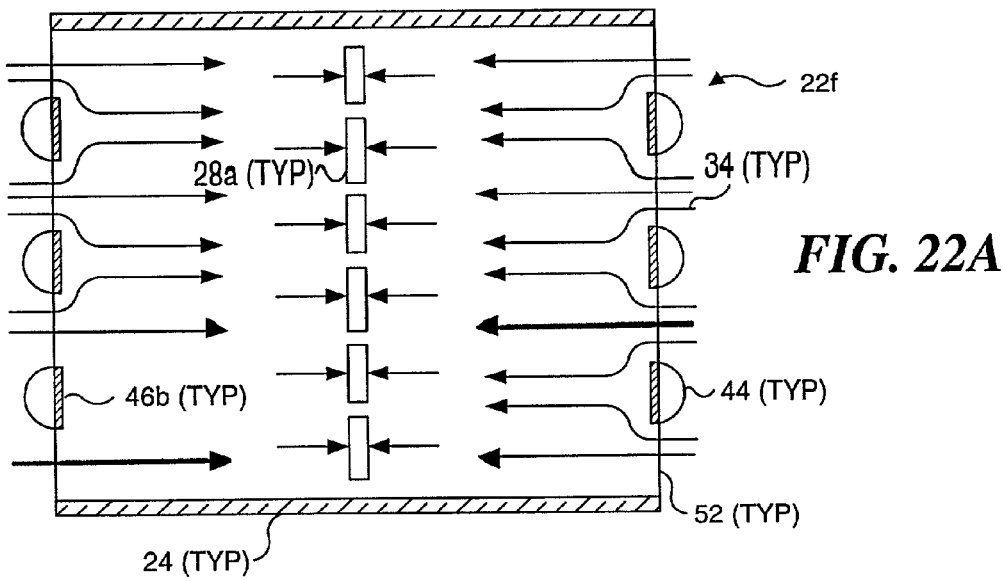
FIG. 22A is a top plan view of a thin sheet defining an untreated fluid channel and a preferred header system.
Figure 22B:
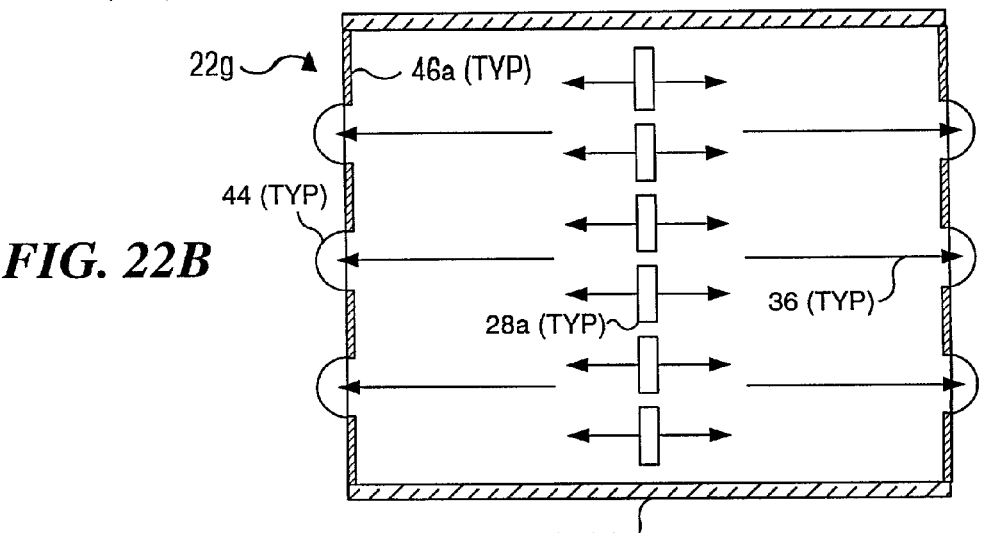
FIG. 22B is a top plan view of a thin sheet defining a treated fluid channel and a preferred header system.

FIGS. 22A and 22B provide additional detail showing how fluid-blocking structures 46a and 46b interact with headers 44 to ensure that the fluid flows through the apparatus in the desired manner. A thin sheet 22f defines one side of an untreated fluid channel as shown in FIG. 22A. Untreated fluid 34 enters the untreated fluid channel through edge ports of thin sheet 22f that are not blocked by headers 44 or spacers 24 (see arrows; these ports correspond to ambient air ports 52). Fluid-blocking structures 46b prevent fluid entering the fluid channel defined above thin sheet 22f from entering any headers 44. Thus, the only path available for the untreated fluid is through orifices 28a and into the thermal treatment zone adjacent to the thermal treatment units disposed in orifices 28a.

A thin sheet 22g shown in FIG. 22B defines one side of a treated fluid channel. Untreated fluid from an adjacent untreated fluid channel (like that in FIG. 22A) enters into the treated fluid channel defined on one side by thin sheet 22g through orifices 28a. Treated fluid 36 is drawn into headers 44 by axial fan 42, as shown in FIG. 15. Fluid-blocking structures 46a (and spacers 24) ensure that treated fluid 36 can only exit the treated fluid channel via headers 44.

Figure 23A:
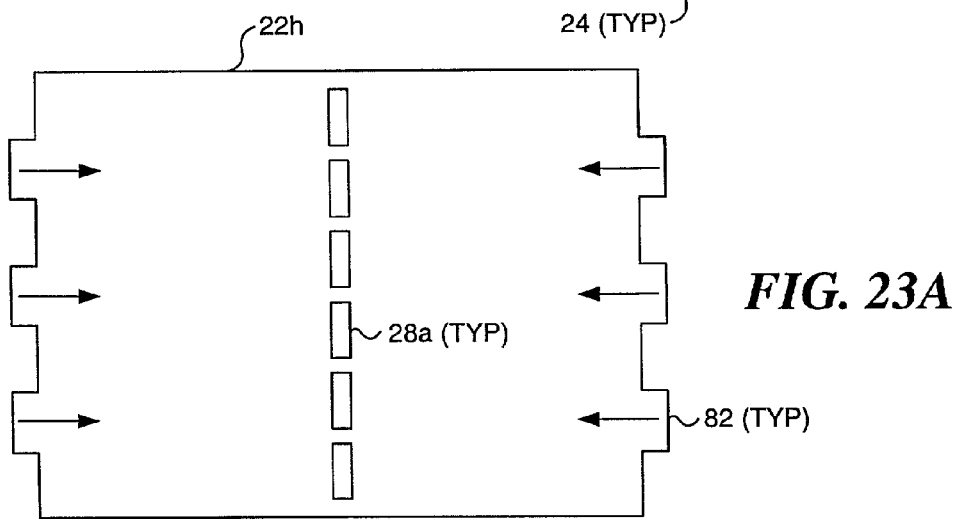
FIG. 23A is a top plan view of a thin sheet defining an untreated fluid channel including tabs that when folded over form fluid-diverting structures.

In the prototype unit mentioned above, fluid-blocking structures 46a and 46b were formed by discrete structures of the correct size and shape that were adhesively bonded to the periphery of the thin sheets in appropriate locations. Of course, these fluid-blocking structures were the same height as the desired gap between adjacent thin sheets. While the prototype unit worked quite satisfactorily, it is anticipated that fluid-blocking structures can be provided in other ways. For example, a thin sheet 22h in FIG. 23A includes a plurality of tabs 82 around its periphery, positioned according to the desired disposition of fluid-blocking structures 46b, as shown in FIG. 22A. It is anticipated that by providing a tab 82 of sufficient size, each tab 82 can be folded inwardly over itself (see directional arrows) a plurality of times, forming a fluid-blocking structure of the desired thickness. Note that tabs 82 are formed when thin sheet 22h is formed, and are therefore integral to thin sheet 22h and do not require that an additional component be attached.

Figure 23B:
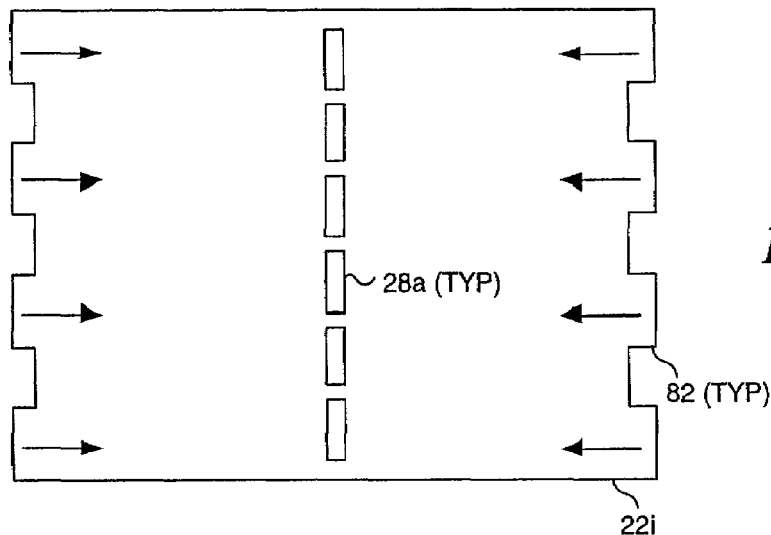
FIG. 23B is a top plan view of a thin sheet defining a treated fluid channel including tabs that when folded over, form fluid diverting structures.

A thin sheet 22i shown in FIG. 23B has a plurality of tabs 82 disposed in an orientation identical to the orientation of the fluid-blocking structures 46a of thin sheet 22g (shown in FIG. 22B). By folding tabs 82 inwardly over themselves in a repeated fashion, a fluid-blocking structure can be created in the desired areas. Creating tabs 82 that extend outwardly further, or folding them with a smaller width, provides more material to be folded so that a thicker fluid-blocking structure can be created. Thus, the size of tabs 82 is related to the desired height for the fluid-blocking structure. Although making a large number of very small folds will result in a thicker fluid-blocking structure from the same-sized tab, it is anticipated that as the folds become smaller in width, the tabs will become more difficult to manipulate.

Figure 24A:
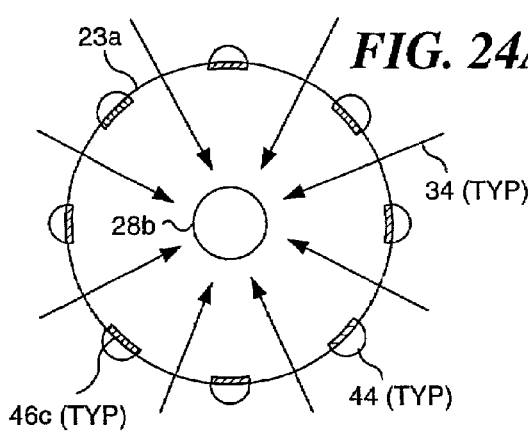
FIG. 24A is a top plan view of an alternative embodiment of a round thin sheet defining an untreated fluid channel and an associated header system.
Figure 24B:
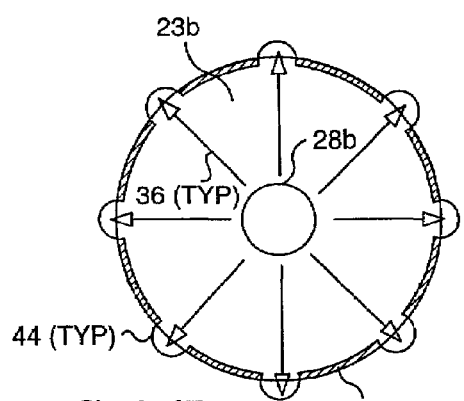
FIG. 24B is a top plan view of an alternative embodiment of a thin round sheet defining a treated fluid channel and an associated header system.

The thin sheets that are used to fabricate an integrated heat exchanger and thermal treatment unit need not be rectangular in shape. FIGS. 24A and 24B illustrate thin sheets 23a and 23b that are round, or more specifically, formed in the shape of a circle, rather than a quadrilateral or rectangle. Thin sheet 23a, shown in FIG. 24A, defines one side of an untreated fluid channel. Untreated fluid 34 is drawn into the center of thin sheet 23a from the periphery of the thin sheet. Note that in this particular embodiment, no insulating panels are disposed on opposing sides of the thin sheet, thus, untreated fluid 34 is drawn into the untreated fluid channel defined by thin sheet 23a through the entire periphery of the thin sheet (except where blocked by headers 44). Fluid-blocking structures 46c prevent untreated fluid 34 from entering headers 44. The only exit for untreated fluid 34 is orifice 28b, in which a thermal treatment unit will be disposed. In the treated fluid channel, shown in FIG. 24B, one side of which is defined by a thin sheet 23b, treated fluid 36 flows from orifice 28b, at the center of thin sheet 23b, toward headers 44. Fluid-blocking structures 46d prevent the treated fluid from exiting the treated fluid channel in ways other than through headers 44.

Figure 25A:
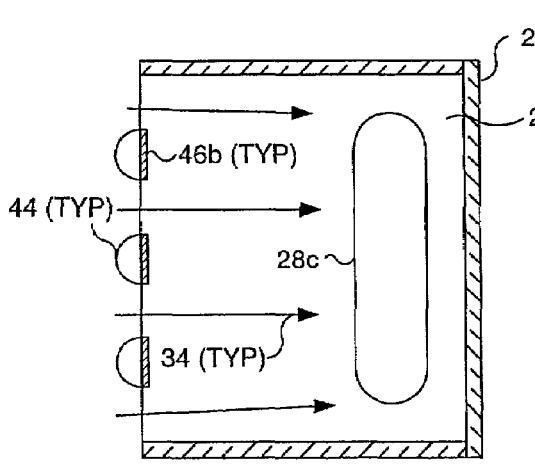
FIG. 25A is a top plan view of another embodiment of a thin sheet defining an untreated fluid channel and a header system.
Figure 25B:
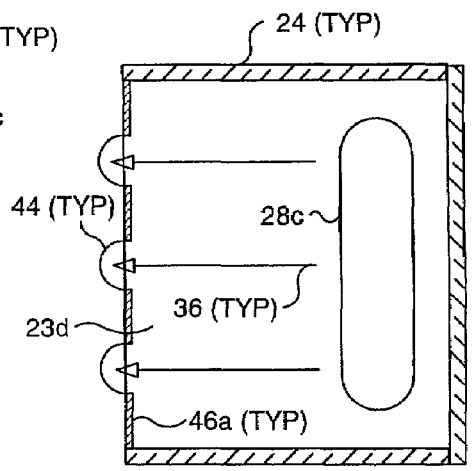
FIG. 25B is a top plan view of another embodiment of a thin sheet defining a treated fluid channel and a header system.

FIGS. 25A and 25B illustrate thin sheets 23c and 23d, which are in the shape of a quadrilateral, but which are designed so that a fluid enters and is exhausted through only one face of the integral heat exchanger and thermal treatment unit in which they are used. In thin sheet 23c shown in FIG. 25A, untreated fluid 34 flows in from the left-hand side of the thin sheet toward an orifice 28c that is disposed adjacent to the right side of the thin sheet. Spacers 24 prevent fluid from entering along the side of thin sheet 23c. Fluid-blocking structures 46b prevent untreated fluid 34 from entering headers 44. The only fluid path available for the untreated fluid is through orifice 28c and past the thermal treatment unit disposed therein. Thin sheet 23d in FIG. 25B defines one side of the treated fluid 36 channel through which treated fluid enters from orifice 28c and is conveyed into headers 44. As discussed above, headers 44 are in fluid communication with axial fan 42 (not shown in this Figure). Fluid-blocking structures 46a prevent treated fluid 36 from exiting the treated fluid channel defined on one side by thin sheet 23d. Spacers 24 prevent treated fluid 36 from exiting via any other side of thin sheet 23d. Optionally, insulated panels 50 (not shown in this Figure) may enclose the three sides adjacent and external to spacers 24.

In the previously described embodiments, only a single header system is employed. A single header system is particularly convenient when the fluid treatment apparatus is being used to treat air. At least a portion of such an air treatment apparatus is in direct fluid communication with the ambient atmosphere (i.e., the front and back faces of scavengers 40 and 41, only a single face for scavengers employing thin sheets 23c and 23d, and all of the periphery of scavengers employing thins sheets 23a and 23b, except where blocked via headers 44). As described above, untreated air is drawn into this apparatus, treated, and then the treated air is exhausted through a header system coupled in fluid communication with the axial fan. Alternatively, untreated air can be forced into a scavenger through a header system and then exhausted into the ambient atmosphere directly from the apparatus without using a second header system.

Figure 26A:
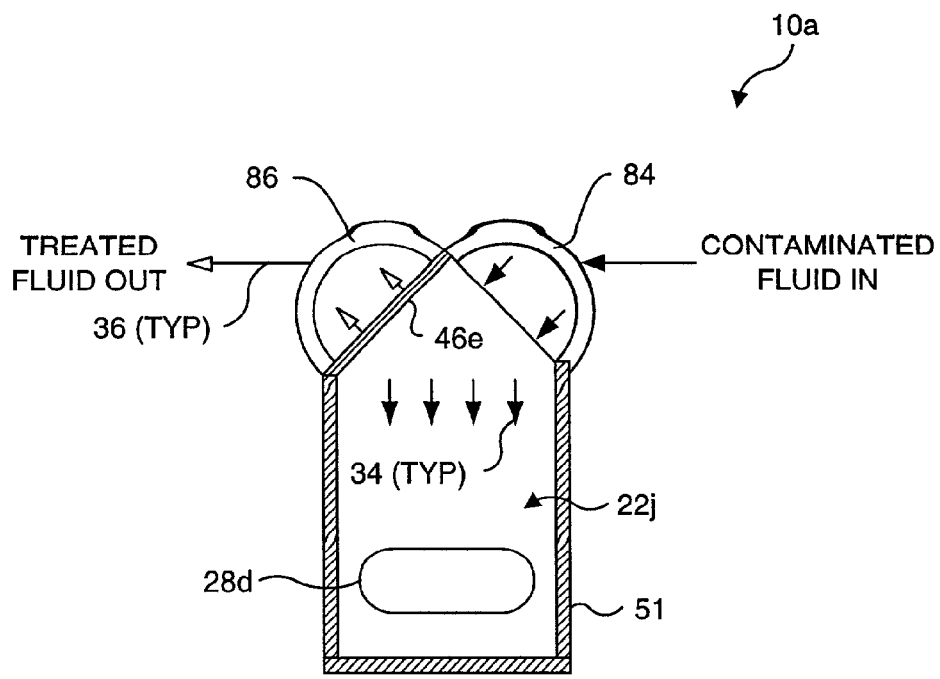
FIG. 26A is a partial plan view of a thin sheet and a related header system for use in a different fluid treatment apparatus, showing a contaminated fluid entering the apparatus.
Figure 26B:
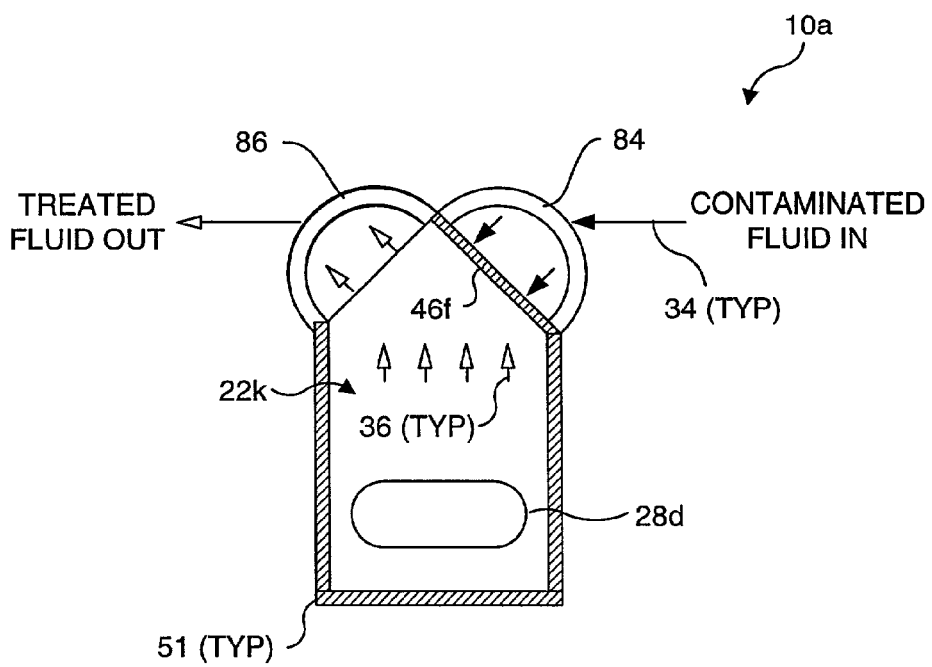
FIG. 26B is a partial plan view of the different fluid treatment apparatus of FIG. 26A, showing a decontaminated fluid exiting the apparatus.

It is anticipated that if the integrated heat exchanger/thermal treatment unit is used to treat fluids other than air, it would be useful to include an additional header system. The additional header system ensures that both the source of the treated fluid and the source of the untreated fluid are easily coupled to an appropriate reservoir. FIGS. 26A and 26B illustrate an embodiment of the present invention that includes two header systems. In FIG. 26A, a contaminated (untreated) fluid 34 is drawn into an integrated heat exchanger/thermal treatment unit 10a via an untreated fluid header 84. This embodiment is similar to the embodiments discussed above, in that it comprises an integrated counter-flow stacked plate heat exchanger and thermal treatment unit; however, no peripheral entry port into the gaps between the thin sheets comprising this apparatus is provided. Fluid can only enter and exit the unit via separate headers. The contaminated fluid is drawn towards an orifice 28d on a thin sheet 22j, which defines one side of the untreated fluid channel shown in FIG. 26A. As discussed above, the desired thermal treatment unit is disposed in the aligned orifices formed in adjacent thin sheets. Note that thin sheet 22j has a different shape than the thin sheets used in the other embodiments discussed above. The actual shape of thin sheet 22j is not critical. What is important is that the only fluid inlet into the untreated fluid channel defined on one side by thin sheet 22j is via untreated fluid header 84, and the only fluid outlet is through orifice 28d. Sealed spacers 51 prevent fluid from escaping into the ambient environment, while a fluid-blocking structure 46e ensures that the untreated fluid 34 cannot flow into a treated fluid header 86. Preferably, sealed spacers 51 not only provide the desired spacing between adjacent thin sheets and seal the untreated fluid channel defined by thin sheet 22j from the environment, but also provide thermal insulation as well. While not shown, it should be understood that integrated heat exchanger/thermal treatment unit 10a can include additional untreated headers 84 and treated headers 86 disposed on opposite faces from the existing headers, such that contaminated fluid enters the integrated heat exchanger/thermal treatment unit through two opposing faces, rather than through the single face, as shown.

In FIG. 26B, treated fluid 36 is shown being directed into treated fluid header 86, which is in fluid communication with a treated fluid reservoir (not separately shown). The treated fluid enters a treated fluid channel defined on one side by thin sheet 22k from orifice 28d. Sealed spacers 51 prevent fluid from escaping into the ambient environment, while a fluid-blocking structure 46f ensures that the treated fluid does not flow into untreated fluid header 84.

It should be noted that in FIGS. 22A-26B, the direction of fluid flow over each thin sheet was defined. If those thin sheets are assembled into a scavenger that is reversible, as discussed above with respect to scavengers 40 and 41, then it should be understood that the fluid flow across the thin sheets of FIGS. 22A-26B can be reversed. For example, thin sheet 22f of FIG. 22A, which is defined above as an untreated fluid channel, can also function as a treated fluid channel, in which case the directions of the arrows representing the fluid flow in FIG. 22A will be reversed.

Experimental Results

A prototype scavenger, constructed in accord with the above discussion, has been fabricated for pre-production evaluation. The prototype included a 250-layer integrated heat exchanger and thermal treatment unit. Each layer comprised a sheet of stainless steel foil that is 25 μm thick. No stiffening elements or dimples were incorporated into the thin sheets, although each thin sheet did include an orifice for receiving a thermal treatment unit. A Nichrome wire heater was used for the thermal treatment unit in this prototype. The stainless steel foil sheets were assembled using spacers and joined using pressure, with a gap of approximately 0.8 mm between each foil sheet.

The required fluid-blocking structures were fabricated from separate stainless steel metal strips. Only one face of the prototype unit was in fluid communication with ambient air, and the other three side faces, as well as the top and bottom, were covered with aerogel insulating panels. Three headers were in fluid communication with alternating gaps on the front face. Each header was also in fluid communication with a plenum and a blower. Depending on the direction of the rotation of the motor in the centrifugal fan blower, air entered the prototype via the blower air ports as described above, or through the ambient air ports that were disposed in alternating gaps along the single face, which was in fluid communication with ambient air. The throughput of the prototype unit was 100 CFM. Only those stainless steel sheets defining an untreated fluid channel incorporated a noble metal-based catalytic treatment zone. The prototype unit occupied less than 2 cubic feet.

The prototype scavenger type air purification apparatus has been shown to be very effective in removing and deactivating toxic species in air during laboratory testing. For example, a test has been conducted to demonstrate the efficacy of the apparatus in removing or deactivating simulated anthrax spores entrained in air. In this test, the apparatus was used to purify air contaminated with an aerosol of *Bacillus globigii* (BG) spores. These spores simulate the spores of *Bacillus anthracis*, which is commonly known as anthrax. In these tests, nearly 90% of the BG spores were destroyed, in a single pass. Since scavenger type air purification units continually re-circulate the air, by continually operating the scavenger, even higher effective kill rates are achievable. In addition to testing a prototype scavenger with respect to its effectiveness in deactivating biological air contaminants, other tests were performed to test the prototype unit's ability to deactivate organic chemicals. The prototype unit was placed in an 8' cubical test chamber, and 20 PPM of propane was introduced. Propane was selected as the test gas because propane is a chemical often used to simulate the destruction of toxic organic chemicals, as most other organic chemicals are easier to deactivate than propane. During this test of the prototype unit, the thermal treatment unit achieved operating temperatures ranging from about 305 C to about 415° C. Roughly 40 minutes of continuous operation was required to reduce the propane concentration by 90%. In comparison, a prior art carbon adsorption-based scavenger system was similarly tested. Given a starting concentration of 18.3 PPM, the prior art carbon adsorption-based scavenger required about 65 minutes to reduce the propane concentration to 7 PPM (approximately a 60% reduction). It should be noted that besides being faster than the carbon adsorption-based scavenger, the prototype unit of the present invention does not reach an equilibrium state in which no more propane can be adsorbed, as does the carbon adsorption-based scavenger, and the prototype does not have the potential to desorb propane back into ambient air, as can happen when using carbon adsorption-based scavengers.

Reactor Type Embodiment

In addition to being able to treat a fluid, it is anticipated that the present invention can be beneficially employed to facilitate the production of a desired chemical product from one or more reactants. Those of ordinary skill in the art will readily recognize that the control of parameters such as temperature, pressure, mixing conditions, relative volumes of the reactants, and the use of catalysts are often critical to producing desired chemical products from one or more reagents. The present invention enables excellent control of temperatures, and a catalyst can be disposed on the thin sheets, as required. The catalyst can alternatively be dispersed within the fluid channels, such as on a powdered alumina support (as in a packed bed reactor), or the catalyst can be coated on a foamed metal substrate. As discussed above, the thermal treatment unit of the present invention can be used to either add or remove thermal energy from a fluid entering the apparatus. Thus, the present invention is suitable for facilitating both exothermic and endothermic chemical reactions.

In addition to the components discussed in detail above, a chemical reactor embodiment preferably includes a chemical reactant feed supply system that enables the flow of reactants into the reactor embodiment to be precisely controlled. Depending on the type of reactant feed supply system employed, a pump/fan 18 as shown in FIG. 1 may not be required. For example, many chemical reactions utilize chemical reactants that are supplied as compressed gases. Such compressed gases generally do not require a pump/fan to drive the gases through a chemical reactor. On the other hand, for reactions requiring liquid reagents or uncompressed gases, a pump/fan may be required to provide a driving force to propel the reagents through the reactor.

A chemical reactor embodiment preferably includes two separate header systems. A first header system directs reactants into alternating fluid channels that represent reactant fluid channels, and a second header system collects a desired chemical product from alternating fluid channels that represent product fluid channels. This chemical reactor embodiment also preferably incorporates leak proof seals disposed between adjacent thin sheets, to improve the yield and efficiency of the selected chemical reaction, and to enable liquid as well as gaseous reagents to be employed.

A schematic block diagram illustrating the primary components of an exemplary chemical reaction system 140 incorporating an integrated heat exchanger/thermal treatment for use as a reactor is shown in FIG. 27. These components include a reactant supply feed system 142, a reactant header 144*a*, an integrated heat exchanger/thermal treatment unit 14a, an optional prime mover and pump/fan 18 (for use when reactants other than compressed gases are utilized), a product header 144b, and a product reservoir 146. Note that because integrated heat exchanger/thermal treatment unit 14a will include reactant fluid channels and product fluid channels in an alternating configuration as described above with respect to the scavenger embodiments, it is anticipated that the positions of reactant supply feed system 142 and product reservoir 146 could be reversed. In such a case, header 144b would become a reactant header, while header 144a would become a product header. The only case in which it would be important to define the relative locations of reactant supply feed system 142 and product reservoir 146 is if a catalyst is disposed on only those fluid channels defining either reactant or product fluid channels. Under this condition, the locations of the feed system and product reservoir relative to the reactor and headers determine which fluid channels are reactant fluid channels and which fluid channels are product fluid channels. The only significant difference between integrated heat exchanger/thermal treatment unit 14a and integrated heat exchanger/thermal treatment unit 14, is that unit 14a is preferably leak tight, whereas some embodiments of unit 14 (such as a scavenger) are not required to be leak tight. As noted above, pump/fan 18 is optional, and required only when the reactant(s) are not compressed gases that use the pressure to force the gas through the reactor. It is anticipated that pump/fan 18 can alternatively be disposed between reactant supply feed system 142 and reactant header 144a.

Reactant supply feed system 142 will include one or more reactants, depending on the desired chemical product. Those of ordinary skill in the art will recognize that some products can be produced by manipulating a single reactant, while other products require two or more reactants. Reactant supply feed system 142 preferably incorporates means for controlling flow rate, such that the relative volumes or rate of flow of individual reactants can be adjusted. For example, the means for controlling flow can be as simple as a properly adjusted valve attached to compressed gas cylinders when the reactants are gases, or valves disposed downstream of a pump that can be used to control a flow of fluid, or a variable speed pump. Such variable flow rate reactant supply feed systems are well known in the art.

Reactant header 114a preferably ensures that reactants are properly mixed before they enter into integrated heat exchanger/thermal treatment unit 14a, and that the reactants are introduced into each reactant fluid channel in integrated heat exchanger/thermal treatment unit 14a, while preventing reactants from entering into product fluid channels. Product header 144b ensures that product exiting integrated heat exchanger/thermal treatment unit 14a is directed to product reservoir 146, and ensures that product does not enter into the reactant fluid channels. The configuration of product reservoir 146 is a function of the product itself. If the product is a gas, the product reservoir must be able to securely contain a gas. Some products may require special temperature or pressure conditions to be provided, and in those cases product reservoir 146 preferably ensures those conditions are maintained.

As before, the thermal treatment unit portion of integrated heat exchanger/thermal treatment unit 14a can be provided by a chiller that removes thermal energy from one or more reactants, or a heater that heats one or more reactants to a temperature required to produce a desired chemical product. The heat exchanger portion of integrated heat exchanger/thermal treatment unit 14a is a high-efficiency heat exchanger that exchanges thermal energy between one or more reactants and a product flowing through adjacent fluid channels. Regardless of whether the thermal treatment unit is a chiller or a heater, the exchange of thermal energy between the reactants and the product reduces the energy required by the thermal treatment unit to modify the temperature of the reactants in order to attain a temperature required to achieve the desired result. As discussed above with respect to integrated heat exchanger/thermal treatment unit 14, while tube-in-tube configuration counterflow heat exchangers can be employed, preferably the heat exchanger portion of integrated heat exchanger/thermal treatment unit 14a is a counterflow stacked plated heat exchanger, such as heat exchanger 20 shown in FIG. 2.

While many types of chemical reactions can be facilitated with the present invention by providing thermal energy to one or more reactants, an exemplary reaction is the disassociation of ammonia into nitrogen and hydrogen. This example requires the input of additional heat energy to drive the reaction, and frequently catalysts are employed to reduce the amount of thermal energy required. Integrated heat exchanger/thermal treatment unit 14a uses waste heat from the product to preheat the ammonia before it enters a thermal treatment/reaction zone, thereby reducing the amount of thermal energy required to be provided by the thermal treatment unit to drive the ammonia disassociation reaction. The disassociation reaction is as follows:

$$(2)NH_3 + \text{ENERGY} \rightarrow N_2 + (3)_{H2} \qquad 1)$$

The ammonia disassociation reaction is endothermic, and thus requires energy to drive it. This energy can be provided in the form of heat. The amount of heat required is a function of the volume of ammonia, the size of the reactor, and the specific catalyst that is employed. Preferably, the catalyst has a light-off (minimum usable) temperature less than about 600° C., and an optimum operating temperature less than about 650° C. While such temperature conditions yield a conversion efficiency that is lower than can be obtained by catalysts that operate at higher temperatures, the lower preferred temperature conditions noted above enable standard materials, such as brass and stainless steel, to be employed in fabricating integrated heat exchanger/thermal treatment unit 14a. The use of standard materials reduces material and fabrication costs.

Empirical studies have identified both a ruthenium-based catalyst and a nickel-based catalyst (Katalco 27-7™, available from ICI/Katalco of the UK) as functionally usable in the desired operating temperature range of 550–650° C. The nickel-based catalyst has a lower activity, meaning a longer residence time (and generally a lower flow rate through the system) than the ruthenium catalyst, but the nickel catalyst is much less expensive. The desired size of a chemical production system is likely to be a factor in the selection of the catalyst. For systems in which compact size is not critical, a nickel catalyst can be employed, whereas the ruthenium-based catalyst is likely to preferred in a compact system. Other catalysts known to catalyze the destruction of ammonia include iron oxide, rhodium, and rhenium. It is anticipated that these catalysts will be incorporated onto the thin sheets making up the heat exchanger portion of integrated heat exchanger/thermal treatment unit 14a, as illustrated and discussed above in relation to FIG. 20.

A schematic block diagram illustrating the primary components of an exemplary chemical reaction system 140a for the disassociation of ammonia into hydrogen and nitrogen employing integrated heat exchanger/thermal treatment unit 14a is shown in FIG. 28. These components include a compressed ammonia supply feed system 142a, reactant header 144a, integrated heat exchanger/thermal treatment unit 14a, product header 144b, and product reservoir 146. Note that because the ammonia is provided as a compressed gas, no pump/fan 18 is required. Also note that the desired product is a mixture of gaseous nitrogen and hydrogen, and as a result, product reservoir 146 must be capable of storing those gases.

Figure 27:
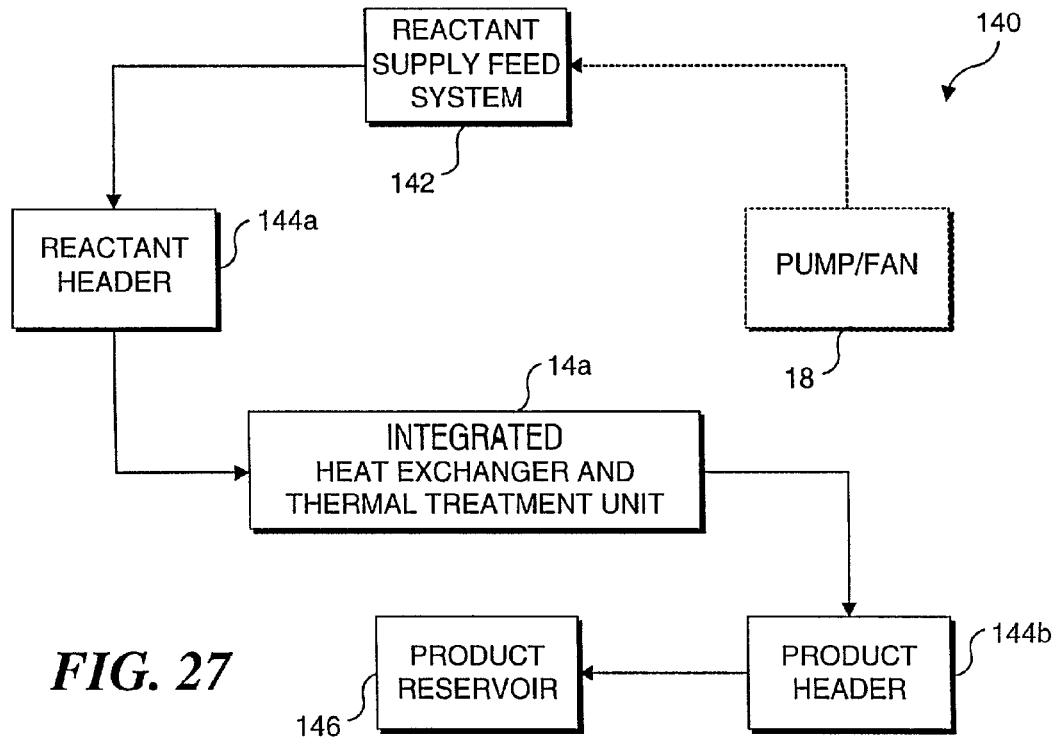
FIG. 27 is a block diagram illustrating components used in the chemical reactor embodiment of the present invention.

An exemplary integrated reactor 141 in accord with the present invention is shown in a partially exploded view in FIG. 29. A product outlet 154 is disposed in fluid communication with a plenum chamber 148 mounted on the top of integrated reactor 141. Product outlet 154 is in fluid communication with product reservoir 146 of FIGS. 27 and 28. A plurality of half-tube shaped product headers 144b are in fluid communication with plenum chamber 148. Insulating panels 150 are mounted to the top, bottom, and on two opposite sides of the integrated heat exchanger and thermal treatment unit comprising integrated reactor 141. As noted earlier, the insulating panels are preferably fabricated from vacuum-formed aerogel, which not only provides excellent insulation, but is also extremely lightweight.

The heat exchanger portion of integrated reactor 141 is assembled from a plurality of stacked thin sheets, as described in detail above. These sheets are stacked using a plurality of spacers 124 to form a plurality of gaps between adjacent thin sheets (see FIG. 2). These gaps are of two distinct types. Gaps 126a are in fluid communication with a pair of reactant inlets 152, while gaps 126b are in fluid communication with product headers 144. Gaps 126a and 126b are disposed in alternating relationship throughout the stack, such that a gap 126a is always adjacent to at least one gap 126b. Each of gaps 126a represents the entire region defined between an upper thin sheet and a lower thin sheet and is in fluid communication with a reactant header 144a. Note that two reactant headers 144a are disposed on opposing sides of integrated reactor 141. Each reactant header 144a includes a reactant inlet 152 that is in fluid communication with reactant supply feed system 142 of FIG. 27.

Although scavengers 40 and 41 require only a single header system, and two opposed faces of these scavengers are exposed to ambient air, integrated reactor 141 is not exposed to ambient air. Reactant headers 144a seal the faces that are exposed to ambient air in the scavenger embodiments, ensuring that only reactants provided by reactant supply feed system 142 are introduced into integrated reactor 141.

During operation, reactants enter integrated reactor 141 via both reactant inlets 152 on opposed faces, and reactant headers 144a ensure that the reactants are able to enter the interior of integrated reactor 141 via the plurality of alternating gaps 126a. The reactants flow into an internal thermal treatment zone (see FIG. 5), where the reactants are heated (or cooled) to the temperature required to facilitate the desired chemical reaction. After passing through thermal treatment zone, the product flows in a counter current fashion through an adjacent gap 126b (see the arrows in FIG. 5), and then into product headers 144b, through plenum 148. Product is exhausted via product outlets 154.

A plurality of fluid-blocking structures 146 are positioned so as to place alternate gaps in fluid communication with either product headers 144b or reactant headers 144a, but not both at the same time. Fluid-blocking structures 146a and 146b, in conjunction with the headers, ensure that reactants and product enter and exit via the appropriate fluid channels defined by the alternating gaps. Fluid-blocking structures 146a prevent gaps 126b, which are in fluid communication with product headers 144b, from also being in fluid communication with reactant headers 144a and reactant inlets 152. A header 144b is shown in phantom view, enabling fluid-blocking structures 46b to be more clearly seen. Fluid-blocking structures 146b prevent gaps 126a, which are in fluid communication with reactant inlets 152 and reactant headers 144a, from also being in fluid communication with product headers 144b. The fluid-blocking structures function as described above with respect to FIGS. 24A–24B and 25A–25B.

Note that fluid-blocking structures 146a and 146b have been shown as shaded elements to differentiate them from adjacent gaps and not to indicate a cross-sectional view. It should be understood that fluid-blocking structures 146b are similarly disposed in all of headers 144b. Also, it will be understood that the number of headers 144b can be varied as desired, and that only a single reactant header 144a can be employed if the thin sheets are configured as illustrated in FIGS. 24A–25B. Regardless of the number of headers 144b employed, the aggregate volume of headers 144b employed should be able to accommodate the desired flow rate of fluid through the reactor.

Although the present invention has been described in connection with the preferred forms of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. An integrated thermal treatment system for treating a fluid, comprising:
   (a) a plurality of untreated fluid channels that convey an untreated fluid into the thermal treatment system;
   (b) a plurality of treated fluid channels that convey a treated fluid out from the thermal treatment system and which are disposed in an alternating relationship with the plurality of untreated fluid channels, such that thermal energy is readily exchanged between the untreated fluid flowing within said plurality of untreated fluid channels and the treated fluid flowing within said plurality of treated fluid channels;
   (c) at least one fluid inlet in fluid communication with said plurality of untreated fluid channels;
   (d) at least one fluid outlet in fluid communication with said plurality of treated fluid channels; and
   (e) a stacked plate heat exchanger portion comprising:
      (i) a plurality of sheets stacked together and separated so that a gap is defined between adjacent sheets, each gap comprising one of said plurality of untreated fluid channels and said plurality of treated fluid channels, such that successive gaps comprise alternating untreated fluid channels and treated fluid channels; and
      (ii) a thermal treatment zone disposed within the stacked plate heat exchanger, said thermal treatment zone comprising means for thermally treating a fluid, said thermal treatment zone being in fluid communication with each untreated fluid channel and with each treated fluid channel.

2. The thermal treatment system of claim 1, further comprising an insulated housing that substantially encloses said plurality of untreated fluid channels, said plurality of treated fluid channels, and said thermal treatment zone, thereby substantially reducing thermal energy exchanged between said thermal treatment system and an environment external to said thermal treatment system.

3. The thermal treatment system of claim 2, wherein said insulated housing comprises a plurality of aerogel panels.

4. The thermal treatment system of claim 1, further comprising a catalytic treatment zone disposed adjacent to said thermal treatment zone and within at least one of each of said plurality of untreated fluid channels and each of said plurality of treated fluid channels; and wherein substantial heat provided by said thermal treatment zone facilitates a catalytic conversion by said catalytic treatment zone.

5. The thermal treatment system of claim 4, wherein said catalytic treatment zone comprises a noble metal catalyst that reduces a temperature required to oxidize an organic chemical contaminant entrained within the untreated fluid.

6. The thermal treatment system of claim 5, wherein said thermal treatment zone is maintained at a temperature in excess of 300 degrees Celsius.

7. The thermal treatment system of claim 1, wherein said thermal treatment zone comprises at least one electric resistive heating element.

8. The thermal treatment system of claim 1, wherein said thermal treatment zone has an operating temperature in excess of 600 degrees Celsius.

9. The thermal treatment system of claim 1, wherein said thermal treatment zone comprises at least one chiller that cools the untreated fluid sufficiently to enable a condensable compound to be condensed and thereby removed from said untreated fluid.

10. The thermal treatment system of claim 1, wherein each of the plurality of sheets includes at least one orifice, the thermal treatment zone being disposed within the orifices in the sheets.

11. The thermal treatment system of claim 10, wherein each of said plurality of sheets comprises a metal foil.

12. Apparatus for thermally treating a fluid, including an integrated heat exchanger and thermal treatment zone, said apparatus comprising:
  (a) a plurality of untreated fluid channels that convey an untreated fluid into the apparatus;
  (b) a plurality of treated fluid channels that convey a treated fluid from the apparatus and which are disposed in an alternating relationship with the plurality of untreated fluid channels, so that thermal energy is readily transferred to the untreated fluid flowing within said plurality of untreated fluid channels from the treated fluid flowing within said plurality of treated fluid channels;
  (c) at least one fluid inlet in fluid communication with said plurality of untreated fluid channels;
  (d) at least one fluid outlet in fluid communication with said plurality of treated fluid channels;
  (e) a stacked plate heat exchanger portion comprising:
    (i) a plurality of sheets stacked together and separated so that a gap is defined between adjacent sheets, each gap comprising one of said plurality of untreated fluid channels and said plurality of treated fluid channels, such that successive gaps comprise alternating untreated fluid channels and treated fluid channels, each sheet having a thickness and a characteristic heat transfer that enables thermal energy to be more readily exchanged between adjacent gaps through a sheet rather than along the sheet, each sheet having at least one orifice disposed such that the orifices of adjacent sheets are in alignment; and
    (ii) at least one face of the stacked plate heat exchanger being in fluid communication with a source of untreated fluid and a volume into which treated fluid is discharged, said at least one face being disposed along an edge of each sheet;
  (f) a thermal treatment zone portion disposed within the orifices in the sheets, said thermal treatment zone comprising means for thermally treating a fluid, said thermal treatment zone being in fluid communication with each untreated fluid channel and with each treated fluid channel;
  (g) means for enabling a flow of fluid through said apparatus; and
  (h) at least one cross-flow header disposed adjacent to said at least one face of said stacked plate heat exchanger, said at least one cross-flow header being in fluid communication with said means and with one of each untreated fluid channel and each treated fluid channel.

13. The apparatus of claim 12, wherein said stacked plate heat exchanger further comprises at least one fluid-blocking structure disposed in each untreated fluid channel and in each treated fluid channel, such that:
  (a) when said at least one cross-flow header is in fluid communication with each untreated fluid channel:
    (i) said at least one fluid-blocking structure disposed in each untreated fluid channel prevents the untreated fluid from entering into each untreated fluid channel via said at least one face, and enables the untreated fluid to enter into each untreated fluid channel via said at least one cross-flow header; and
    (ii) said at least one fluid-blocking structure disposed in each treated fluid channel prevents a treated fluid from entering into said at least one cross-flow header, and enables treated fluid to exit said apparatus via said at least one face;
  (b) when said at least one cross-flow header is in fluid communication with each treated fluid channel:
    (i) said at least one fluid-blocking structure disposed in each untreated fluid channel enables an untreated fluid to enter into each untreated fluid channel via said at least one face, and prevents untreated fluid from entering into said at least one cross-flow header; and
    (ii) said at least one fluid-blocking structure disposed in each treated fluid channel prevents the treated fluid from exiting said apparatus via said at least one face, and enables the treated fluid to enter into said at least one cross-flow header.

14. The apparatus of claim 12, wherein said means for enabling a flow of fluid comprises at least one of a pump, a fan, and an impeller.

15. The apparatus of claim 12, wherein said means for thermally treating a fluid comprises a chiller for condensing a condensable material to remove the condensable material from the untreated fluid.

16. The apparatus of claim 12, wherein said means for thermally treating a fluid comprises a heater for deactivating at least one of a biological contaminant and a chemical contaminant contained within said untreated fluid.

17. The apparatus of claim 16, wherein said heater comprises at least one electric resistive element.

18. The apparatus of claim 16, further comprising a catalytic treatment zone disposed adjacent to said thermal treatment zone and to one of each of said plurality of untreated fluid channels and each of said plurality of treated fluid channels, so that heat provided by said thermal treatment zone facilitates a catalytic reaction in said catalytic treatment zone.

19. The apparatus of claim 16, further comprising an acid gas-absorbent material disposed in said treated fluid channel, such that any acid gas generated in said thermal treatment zone is removed from the treated fluid when that treated fluid passes through said acid gas-absorbent material.

20. The apparatus of claim 12, wherein said untreated fluid comprises air.

21. The apparatus of claim 12, wherein said sheets are one of quadrilateral in shape, and substantially round in shape.

22. The apparatus of claim 12, wherein said at least one cross-flow header comprises a half tube.

23. The apparatus of claim 12, wherein said at least one orifice in each sheet is disposed proximate one of a center of each sheet, and a center axis of each sheet.

24. The apparatus of claim 12, wherein said sheets comprise a metal foil.

25. The apparatus of claim 12, further comprising an insulated housing that substantially encloses said stacked plate heat exchanger and said thermal treatment zone.

26. The apparatus of claim 12, wherein said sheets comprise surface features that extend outwardly of a planar surface of the sheets and separate adjacent sheets, thereby aiding in maintaining said gap between adjacent sheets.

27. The apparatus of claim 26, wherein said surface features comprise a plurality of dimples formed into each sheet, such that a height of each dimple substantially equals a thickness of said gap.

28. The apparatus of claim 12, wherein said sheets include surface features that stiffen each sheet.

29. The apparatus of claim 28, wherein said surface features comprise at least one of a plurality of ribs extending substantially perpendicular to a direction of a flow of fluid in said apparatus, and a plurality of ribs extending substantially parallel to a direction of a flow of fluid in said apparatus.

30. Apparatus for thermally treating a fluid, including an integrated heat exchanger and thermal treatment zone that substantially reduces energy required to thermally treat a fluid, eliminates a need for seals and a header for connecting a heat exchanger section with a thermal treatment section, and has at least one of a header-less fluid inlet and a header-less fluid outlet, thereby eliminating a need for both a fluid inlet header and a fluid outlet header, comprising:
 (a) a heat exchanger, comprising:
  (i) a plurality of metal foil sheets stacked together in spaced-apart layers so that a gap is defined between adjacent metal foil sheets, each gap comprising one of an untreated fluid channel and a treated fluid channel, untreated fluid channels alternating with treated fluid channels, each metal foil sheet having a thickness that enables thermal energy to be readily exchanged between adjacent untreated and treated fluid channels and including at least one orifice, orifices in adjacent metal foil sheets being aligned;
  (ii) at least one fluid inlet in fluid communication with each untreated fluid channel and a volume of untreated fluid; and
  (iii) at least one fluid outlet in fluid communication with each treated fluid channel and a volume into which a treated fluid is discharged;
 (b) at least one thermal treatment unit integrated into said heat exchanger, disposed within the orifices of the metal foil sheets;
 (c) a plurality of insulated panels at least partially enclosing the heat exchanger, such that at least an upper surface and a lower surface of the heat exchanger are insulated, and such that at least one surface of the heat exchanger is in fluid communication with one of a volume of untreated fluid, and a volume into which a treated fluid is discharged;
 (d) means for driving a fluid through said heat exchanger, said means being in fluid communication with one of each untreated fluid channel and each treated fluid channel, and with one of the volume of untreated fluid, and the volume into which a treated fluid is discharged; and
 (e) a header system in fluid communication with said means for driving, and with only one of each untreated fluid channel and each treated fluid channel.

31. An integrated thermal treatment system for treating a fluid, comprising:
 (a) a plurality of untreated fluid channels that convey an untreated fluid into the thermal treatment system;
 (b) a plurality of treated fluid channels that convey a treated fluid out from the thermal treatment system and which are disposed in an alternating relationship with the plurality of untreated fluid channels, such that thermal energy is readily exchanged between the untreated fluid flowing within said plurality of untreated fluid channels and the treated fluid flowing within said plurality of treated fluid channels;
 (c) at least one fluid inlet in fluid communication with said plurality of untreated fluid channels;
 (d) at least one fluid outlet in fluid communication with said plurality of treated fluid channels; and
 (e) a stacked plate heat exchanger portion comprising:
  (i) a plurality of sheets stacked together and separated so that a gap is defined between adjacent sheets, each gap comprising one of said plurality of untreated fluid channels and said plurality of treated fluid channels, such that successive gaps comprise alternating untreated fluid channels and treated fluid channels; and
  (ii) a thermal treatment zone disposed within the stacked plate heat exchanger, said thermal treatment zone comprising means for thermally treating a fluid, said thermal treatment zone being in fluid communication with each untreated fluid channel and with each treated fluid channel, such that each portion of the plurality of treated fluid channels closest to the thermal treatment zone is equidistant to each portion of the plurality of untreated fluid channels closest to the thermal treatment zone.

* * * * *